US012470503B2

(12) United States Patent
Ball et al.

(10) Patent No.: US 12,470,503 B2
(45) Date of Patent: *Nov. 11, 2025

(54) CUSTOMIZED MESSAGE SUGGESTION WITH USER EMBEDDING VECTORS

(71) Applicant: ASAPP, INC., New York, NY (US)

(72) Inventors: Kelsey Taylor Ball, Jersey City, NJ (US); Tao Lei, Jersey City, NJ (US); Christopher David Fox, Mastic, NY (US); Joseph Ellsworth Hackman, New York, NY (US)

(73) Assignee: ASAPP, INC., New York, NY (US)

( * ) Notice: Subject to any disclaimer, the term of this patent is extended or adjusted under 35 U.S.C. 154(b) by 700 days.

This patent is subject to a terminal disclaimer.

(21) Appl. No.: 17/856,752

(22) Filed: Jul. 1, 2022

(65) Prior Publication Data

US 2022/0337538 A1    Oct. 20, 2022

Related U.S. Application Data

(63) Continuation of application No. 16/663,872, filed on Oct. 25, 2019, now Pat. No. 11,425,064.

(51) Int. Cl.
*G06F 40/00* (2020.01)
*G06F 40/56* (2020.01)
(Continued)

(52) U.S. Cl.
CPC ............ *H04L 51/046* (2013.01); *G06F 40/56* (2020.01); *G06N 3/049* (2013.01)

(58) Field of Classification Search
CPC ... G10L 15/26; G10L 2015/223; G10L 15/22; G10L 25/63; G10L 15/1822;
(Continued)

(56) References Cited

U.S. PATENT DOCUMENTS

| 4,941,178 A | 7/1990 | Chuang |
| 5,195,034 A | 3/1993 | Garneau et al. |

(Continued)

FOREIGN PATENT DOCUMENTS

| CN | 1633817 A | 6/2005 |
| CN | 104598445 A | 5/2015 |

(Continued)

OTHER PUBLICATIONS

E. Papegnies, V. Labatut, R. Dufour and G. Linares, "Conversational Networks for Automatic Online Moderation," in IEEE Transactions on Computational Social Systems, vol. 6, No. 1, pp. 38-55, Feb. 2019. (Year: 2019).*

(Continued)

*Primary Examiner* — Edgar X Guerra-Erazo
(74) *Attorney, Agent, or Firm* — GTC Law Group PC & Affiliates

(57) ABSTRACT

A message may be suggested to a user participating in a conversation using one or more neural networks where the suggested message is adapted to the preferences or communication style of the user. The suggested message may be adapted to the user with a user embedding vector that represents the preferences or communication style of the user in a vector space. To suggest a message to the user, a conversation feature vector may be computed by processing the text of the conversation with a neural network. A context score may be computed for one or more designated messages, where the context score is computed by processing the user embedding vector, the conversation feature vector, and a designated message feature vector with a neural network. A designated message may be selected as a suggested message for the user using the context scores. The suggestion may then be presented to the user.

21 Claims, 9 Drawing Sheets

(51) Int. Cl.
*G06N 3/049* (2023.01)
*H04L 51/046* (2022.01)

(58) Field of Classification Search
CPC ........... G10L 2015/228; G10L 15/1815; G10L 15/16; G10L 15/197; G10L 15/34; G10L 17/00; G10L 17/26; G10L 2015/0638; G10L 15/222; G10L 2015/221; G10L 2015/225; G10L 15/30; G10L 15/32; G10L 15/285; G10L 15/28; G10L 17/04; G10L 17/02; G10L 17/18; G10L 17/22; G10L 17/24; G10L 25/27; G10L 25/30; G10L 25/54; G10L 25/48; G06N 20/00; G06N 3/08; G06N 20/10; G06N 7/005; G06N 3/006; G06N 5/02; G06N 5/022; G06N 5/025; G06N 5/04; G06N 3/02; G06N 3/04; G06N 3/0454; G06N 3/0481; G06N 3/049; G06N 3/0409; G06N 3/008; G06F 40/30; G06F 40/58; G06F 40/35; G06F 40/40; G06F 40/56; G06F 40/00; G06F 40/10; G06F 40/12; G06F 40/20; G06F 40/205; G06F 40/211; G06F 40/221; G06F 40/226; G06F 40/216; G06F 40/237; G06F 40/253; G06F 40/263; G06F 40/268; G06F 40/274; G06F 40/279; G06F 40/284; G06F 40/289; G06F 40/295
See application file for complete search history.

(56) References Cited

U.S. PATENT DOCUMENTS

| | | |
|---|---|---|
| 5,227,971 A | 7/1993 | Nakajima et al. |
| 5,369,575 A | 11/1994 | Lamberti et al. |
| 5,627,940 A | 5/1997 | Rohra et al. |
| 6,173,279 B1 | 1/2001 | Levin et al. |
| 6,177,932 B1 | 1/2001 | Galdes et al. |
| 6,327,363 B1 | 12/2001 | Henderson et al. |
| 6,356,869 B1 | 3/2002 | Chapados et al. |
| 6,381,645 B1 | 4/2002 | Sassin et al. |
| 6,453,292 B2 | 9/2002 | Ramaswamy et al. |
| 6,823,313 B1 | 11/2004 | Yuchimiuk et al. |
| 6,915,254 B1 | 7/2005 | Heinze et al. |
| 6,981,040 B1 | 12/2005 | Konig et al. |
| H2187 H | 4/2007 | Yuchimiuk et al. |
| 7,257,564 B2 | 8/2007 | Loughmiller et al. |
| 7,603,330 B2 | 10/2009 | Gupta et al. |
| 7,644,057 B2 | 1/2010 | Nelken et al. |
| 8,024,196 B1 | 9/2011 | Wodtke et al. |
| 8,054,951 B1 | 11/2011 | Winslow et al. |
| 8,156,138 B2 | 4/2012 | Kohn et al. |
| 8,271,403 B2 | 9/2012 | Rieck et al. |
| 8,494,152 B1 | 7/2013 | Roberts et al. |
| 8,577,671 B1 | 11/2013 | Barve et al. |
| 8,626,509 B2 | 1/2014 | Roy et al. |
| 8,812,292 B2 | 8/2014 | Ceusters et al. |
| 8,972,240 B2 | 3/2015 | Brockett et al. |
| 9,043,197 B1 | 5/2015 | Pasca et al. |
| 9,336,269 B1 | 5/2016 | Smith et al. |
| 9,591,136 B1 | 3/2017 | Garcia et al. |
| 9,602,987 B1 | 3/2017 | Wittig |
| 9,715,496 B1 | 7/2017 | Sapoznik et al. |
| 9,723,151 B2 | 8/2017 | McGann et al. |
| 9,727,925 B2 | 8/2017 | Subramanian et al. |
| 9,742,916 B1 | 8/2017 | Christopher |
| 9,761,222 B1 | 9/2017 | Scarasso et al. |
| 9,762,733 B1 | 9/2017 | Ramanujaiaha et al. |
| 9,805,371 B1 | 10/2017 | Sapoznik et al. |
| 9,807,037 B1 | 10/2017 | Sapoznik et al. |
| 9,875,440 B1 | 1/2018 | Commons |
| 9,892,414 B1 | 2/2018 | Henry |
| 9,911,413 B1 | 3/2018 | Kumar et al. |
| 10,049,663 B2 | 8/2018 | Orr et al. |
| 10,067,938 B2 | 9/2018 | Bellegarda |
| 10,083,451 B2 | 9/2018 | Sehrawat et al. |
| 10,083,690 B2 | 9/2018 | Giuli et al. |
| 10,089,072 B2 | 10/2018 | Piersol et al. |
| 10,097,690 B1 | 10/2018 | Henry |
| 10,109,275 B2 | 10/2018 | Henry |
| 10,127,908 B1 | 11/2018 | Deller et al. |
| 10,169,315 B1 | 1/2019 | Heckel et al. |
| 10,210,244 B1 | 2/2019 | Branavan et al. |
| 10,387,888 B2 | 8/2019 | Sapoznik et al. |
| 10,410,655 B2 | 9/2019 | Malur Srinivasan et al. |
| 10,453,074 B2 | 10/2019 | Sapoznik et al. |
| 10,482,875 B2 | 11/2019 | Henry |
| 10,489,792 B2 | 11/2019 | Hackman et al. |
| 10,490,182 B1 | 11/2019 | Madhavaraj et al. |
| 10,497,004 B2 | 12/2019 | Shaev et al. |
| 10,599,774 B1 | 3/2020 | Luo et al. |
| 10,650,311 B2 | 5/2020 | Henry |
| 10,733,614 B2 | 8/2020 | Sapoznik et al. |
| 10,747,957 B2 | 8/2020 | Wohlwend |
| 10,878,181 B2 | 12/2020 | Heckel et al. |
| 11,216,510 B2 | 1/2022 | Jiang et al. |
| 11,425,064 B2 * | 8/2022 | Ball .................. G06F 40/44 |
| 2003/0033288 A1 | 2/2003 | Shanahan et al. |
| 2003/0033347 A1 | 2/2003 | Bolle et al. |
| 2003/0103621 A1 | 6/2003 | Brown et al. |
| 2004/0003283 A1 | 1/2004 | Goodman et al. |
| 2004/0254904 A1 | 12/2004 | Nelken et al. |
| 2005/0076084 A1 | 4/2005 | Loughmiller et al. |
| 2005/0105712 A1 | 5/2005 | Williams et al. |
| 2005/0228790 A1 | 10/2005 | Ronnewinkel et al. |
| 2006/0112127 A1 | 5/2006 | Krause et al. |
| 2006/0173776 A1 | 8/2006 | Shalley et al. |
| 2007/0094217 A1 | 4/2007 | Ronnewinkel et al. |
| 2007/0100618 A1 | 5/2007 | Lee et al. |
| 2007/0100625 A1 | 5/2007 | Silvera et al. |
| 2007/0121899 A1 | 5/2007 | Galvin |
| 2007/0156406 A1 | 7/2007 | Barton et al. |
| 2007/0168448 A1 | 7/2007 | Garbow et al. |
| 2008/0091435 A1 | 4/2008 | Strope et al. |
| 2008/0112620 A1 | 5/2008 | Jiang |
| 2008/0168070 A1 | 7/2008 | Naphade et al. |
| 2008/0168135 A1 | 7/2008 | Redlich et al. |
| 2009/0018829 A1 | 1/2009 | Kuperstein |
| 2009/0306967 A1 | 12/2009 | Nicolov et al. |
| 2011/0066634 A1 | 3/2011 | Phillips et al. |
| 2011/0082825 A1 | 4/2011 | Sathish et al. |
| 2011/0093414 A1 | 4/2011 | Xu et al. |
| 2011/0173346 A1 | 7/2011 | Neben |
| 2011/0239113 A1 | 9/2011 | Hung et al. |
| 2011/0270771 A1 | 11/2011 | Coursimault et al. |
| 2011/0286596 A1 | 11/2011 | Gressel et al. |
| 2011/0314012 A1 | 12/2011 | Kenthapadi et al. |
| 2012/0005515 A1 | 1/2012 | Reddi et al. |
| 2012/0053945 A1 | 3/2012 | Gupta et al. |
| 2012/0102130 A1 | 4/2012 | Guyot et al. |
| 2012/0239380 A1 | 9/2012 | Cumby et al. |
| 2012/0266258 A1 | 10/2012 | Tuchman et al. |
| 2013/0027612 A1 | 1/2013 | Miloseski et al. |
| 2013/0035931 A1 | 2/2013 | Ferrucci et al. |
| 2013/0143587 A1 | 6/2013 | Williams et al. |
| 2013/0144605 A1 | 6/2013 | Brager et al. |
| 2013/0166485 A1 | 6/2013 | Hoffmann et al. |
| 2013/0173604 A1 | 7/2013 | Li et al. |
| 2013/0311997 A1 | 11/2013 | Gruber et al. |
| 2013/0317808 A1 | 11/2013 | Kruel et al. |
| 2014/0040748 A1 | 2/2014 | Lemay et al. |
| 2014/0047234 A1 | 2/2014 | Davis et al. |
| 2014/0075004 A1 | 3/2014 | Van Dusen et al. |
| 2014/0079195 A1 | 3/2014 | Srivastava et al. |
| 2014/0180788 A1 | 6/2014 | George et al. |
| 2014/0278379 A1 | 9/2014 | Coccaro et al. |
| 2014/0282138 A1 | 9/2014 | Hopton et al. |
| 2014/0297268 A1 | 10/2014 | Govrin et al. |
| 2014/0297281 A1 | 10/2014 | Togawa et al. |
| 2014/0314225 A1 | 10/2014 | Riahi et al. |
| 2014/0317030 A1 | 10/2014 | Shen et al. |
| 2014/0330818 A1 | 11/2014 | Raina et al. |

(56) References Cited

U.S. PATENT DOCUMENTS

| | | |
|---|---|---|
| 2014/0365209 A1 | 12/2014 | Evermann |
| 2015/0006143 A1 | 1/2015 | Skiba et al. |
| 2015/0032724 A1 | 1/2015 | Thirugnanasundaram et al. |
| 2015/0033106 A1 | 1/2015 | Stetson et al. |
| 2015/0052002 A1 | 2/2015 | Welch et al. |
| 2015/0073798 A1 | 3/2015 | Karov et al. |
| 2015/0142704 A1 | 5/2015 | London |
| 2015/0149177 A1 | 5/2015 | Kalns et al. |
| 2015/0154285 A1 | 6/2015 | Saarinen et al. |
| 2015/0178390 A1 | 6/2015 | Torras |
| 2015/0195406 A1 | 7/2015 | Dwyer et al. |
| 2015/0215624 A1 | 7/2015 | Wei |
| 2015/0220833 A1 | 8/2015 | Le |
| 2015/0220995 A1 | 8/2015 | Guyot et al. |
| 2015/0228275 A1 | 8/2015 | Watanabe et al. |
| 2015/0242385 A1 | 8/2015 | Bao et al. |
| 2015/0309987 A1 | 10/2015 | Epstein et al. |
| 2015/0310377 A1 | 10/2015 | Duval et al. |
| 2015/0340032 A1 | 11/2015 | Gruenstein |
| 2015/0363393 A1 | 12/2015 | Williams et al. |
| 2015/0365387 A1 | 12/2015 | Good |
| 2016/0019816 A1 | 1/2016 | Parry et al. |
| 2016/0063067 A1 | 3/2016 | Maitra et al. |
| 2016/0078456 A1 | 3/2016 | Chakraborty et al. |
| 2016/0092688 A1 | 3/2016 | Wolrich et al. |
| 2016/0163311 A1 | 6/2016 | Crook et al. |
| 2016/0163314 A1 | 6/2016 | Fujii et al. |
| 2016/0180151 A1 | 6/2016 | Philbin et al. |
| 2016/0180838 A1 | 6/2016 | Parada San Martin et al. |
| 2016/0182672 A1 | 6/2016 | Kuperman et al. |
| 2016/0239846 A1 | 8/2016 | Arvapally et al. |
| 2016/0247068 A1 | 8/2016 | Lin |
| 2016/0255034 A1 | 9/2016 | Yuan |
| 2016/0323217 A1 | 11/2016 | Subramani et al. |
| 2016/0323398 A1 | 11/2016 | Guo et al. |
| 2016/0328388 A1 | 11/2016 | Cao et al. |
| 2016/0364522 A1 | 12/2016 | Frey et al. |
| 2017/0011279 A1 | 1/2017 | Soldevila et al. |
| 2017/0013073 A1 | 1/2017 | Mendez et al. |
| 2017/0060844 A1 | 3/2017 | He et al. |
| 2017/0091320 A1 | 3/2017 | Psota et al. |
| 2017/0103324 A1 | 4/2017 | Weston et al. |
| 2017/0116982 A1 | 4/2017 | Gelfenbeyn et al. |
| 2017/0147682 A1 | 5/2017 | Alaqeeli et al. |
| 2017/0148073 A1 | 5/2017 | Nomula et al. |
| 2017/0177712 A1 | 6/2017 | Kopru et al. |
| 2017/0200077 A1 | 7/2017 | Weston et al. |
| 2017/0213138 A1 | 7/2017 | Bojja et al. |
| 2017/0286404 A1 | 10/2017 | Liu et al. |
| 2017/0308523 A1 | 10/2017 | Wang et al. |
| 2017/0323016 A1 | 11/2017 | Feng et al. |
| 2017/0336969 A1 | 11/2017 | Bi |
| 2018/0005112 A1 | 1/2018 | Iso-Sipila et al. |
| 2018/0012231 A1 | 1/2018 | Sapoznik et al. |
| 2018/0012232 A1 | 1/2018 | Sehrawat et al. |
| 2018/0013699 A1 | 1/2018 | Sapoznik et al. |
| 2018/0018562 A1 | 1/2018 | Jung |
| 2018/0032755 A1 | 2/2018 | Odinak |
| 2018/0052664 A1 | 2/2018 | Zhang et al. |
| 2018/0068233 A1 | 3/2018 | Miranda et al. |
| 2018/0121415 A1 | 5/2018 | Perez et al. |
| 2018/0121738 A1 | 5/2018 | Womack et al. |
| 2018/0131645 A1 | 5/2018 | Magliozzi et al. |
| 2018/0143965 A1 | 5/2018 | Willson et al. |
| 2018/0174020 A1 | 6/2018 | Wu |
| 2018/0174037 A1 | 6/2018 | Henry |
| 2018/0174579 A1 | 6/2018 | Henry |
| 2018/0181807 A1 | 6/2018 | Yankov |
| 2018/0196796 A1 | 7/2018 | Wu |
| 2018/0203848 A1 | 7/2018 | Perez et al. |
| 2018/0232434 A1 | 8/2018 | Geyik et al. |
| 2018/0239830 A1 | 8/2018 | Dialani et al. |
| 2018/0253734 A1 | 9/2018 | Henry |
| 2018/0260680 A1 | 9/2018 | Finkelstein et al. |
| 2018/0285599 A1 | 10/2018 | Praveen et al. |
| 2018/0329886 A1 | 11/2018 | Li et al. |
| 2018/0357439 A1 | 12/2018 | Osotio |
| 2018/0365702 A1 | 12/2018 | Sehrawat et al. |
| 2018/0376002 A1 | 12/2018 | Abraham |
| 2019/0019197 A1 | 1/2019 | Roberts et al. |
| 2019/0019503 A1 | 1/2019 | Henry |
| 2019/0051302 A1 | 2/2019 | Gonzalez et al. |
| 2019/0088270 A1 | 3/2019 | Malur Srinivasan et al. |
| 2019/0102378 A1 | 4/2019 | Piernot et al. |
| 2019/0122101 A1 | 4/2019 | Lei |
| 2019/0163735 A1 | 5/2019 | Xu et al. |
| 2019/0180288 A1 | 6/2019 | Shaev et al. |
| 2019/0182383 A1 | 6/2019 | Shaev et al. |
| 2019/0213601 A1 | 7/2019 | Hackman et al. |
| 2019/0286700 A1 | 9/2019 | Jayaraman et al. |
| 2019/0311375 A1 | 10/2019 | Sapoznik et al. |
| 2019/0332658 A1 | 10/2019 | Heckel et al. |
| 2019/0340201 A1 | 11/2019 | Havens et al. |
| 2019/0341021 A1 | 11/2019 | Shang et al. |
| 2020/0019609 A1 | 1/2020 | Yu et al. |
| 2020/0042613 A1 | 2/2020 | Jiang et al. |
| 2020/0043015 A1 | 2/2020 | Shaev et al. |
| 2020/0081939 A1 | 3/2020 | Subramaniam |
| 2020/0151253 A1 | 5/2020 | Wohlwend et al. |
| 2020/0151254 A1 | 5/2020 | Wohlwend |
| 2020/0327555 A1 | 10/2020 | Sapoznik et al. |
| 2020/0380076 A1 | 12/2020 | Taylor |
| 2021/0073461 A1 | 3/2021 | Heckel et al. |
| 2021/0082412 A1 | 3/2021 | Kennewick |
| 2021/0126881 A1 | 4/2021 | Ball et al. |
| 2021/0165960 A1 | 6/2021 | Eisenschlos et al. |

FOREIGN PATENT DOCUMENTS

| | | |
|---|---|---|
| CN | 105009556 A | 10/2015 |
| WO | 2018009231 A1 | 1/2018 |
| WO | 2018009432 A1 | 1/2018 |
| WO | 2018160492 A1 | 9/2018 |
| WO | 2019113409 A1 | 6/2019 |
| WO | 2019113409 A8 | 7/2019 |

OTHER PUBLICATIONS

K. Misra, H. Devarapalli, T. R. Ringenberg and J. T. Rayz, "Authorship Analysis of Online Predatory Conversations using Character Level Convolution Neural Networks," 2019 IEEE International Conference on Systems, Man and Cybernetics (SMC), Bari, Italy, 2019, pp. 623-628. (Year: 2019).*

"scikit-learn: Machine Learning in Python", scikit-learn 0.17.1 documentation, http://scikit-learn.org/stable/ (accessed on Sep. 20, 2016), 3 pages.

"Using algorithms for advanced customer care", Nokia Strategic white paper, https://resources.ext.nokia.com/asset/200614 (accessed Jul. 26, 2017), 2017, 11 pages.

16908347.4, , "European Application Serial No. 16908347.4, Extended European Search Report mailed Nov. 20, 2019", ASAPP, Inc., 11 pages.

18885265.1, , "European Application Serial No. 18885265.1, Extended European Search Report mailed Mar. 29, 2021", ASAPP, Inc., 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Anderson, Jr., Walton O. , "Customer relationship management in an e-business environment", IEMC'01 Proceedings. Change Management and the New Industrial Revolution. IEMC-2001 (Cat. No. 01CH37286),, doi: 10.1109/IEMC.2001.960548., 2001, pp. 311-316.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bang, Jeesoo et al., "Open-domain personalized dialog system using user-interested topics in system responses", 2015 IEEE Workshop on Automatic Speech Recognition and Understanding (ASRU), doi: 10.1109/ASRU.2015.7404866, 2015, pp. 771-776.

(56) References Cited

OTHER PUBLICATIONS

Bartl, Alexander et al., "A retrieval-based dialogue system utilizing utterance and context embeddings", In 2017 16th IEEE International Conference on Machine Learning and Applications (ICMLA), 2017, pp. 1120-1125.
Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.
Berger, Mark J., "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.
Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.
Blei, David M. et al., "Latent Dirichlet Allocation", Journal of Machine Learning Research, vol. 3, 2003, pp. 993-1022.
Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).
Cai, Lijuan et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.
Carrier, Pierre L. et al., "LSTM Networks for Sentiment Analysis", http://deeplearning.net/tutorial/lstm.html, accessed on Sep. 20, 2016, 5 pages.
Chandar, Sarath et al., "Correlational Neural Networks", CoRR abs/1504.07225, http://arxiv.org/abs/1504.07225, Oct. 12, 2015, 27 pages.
Chen, Mia X. et al., "Gmail Smart Compose: Real-Time Assisted Writing", arXiv:1906.00080v1 [cs.CL], https://arxiv.org/pdf/1906.00080.pdf (accessed on Mar. 25, 2020), May 17, 2019, 9 pages.
Chen, Wenlin et al., "Compressing Neural Networks with the Hashing Trick", arXiv:1504.04788v1, https://arxiv.org/pdf/1504.04788.pdf (accessed on Nov. 26, 2018), Apr. 19, 2015, 10 pages.
Chen, Yun-Nung et al., "An empirical investigation of sparse log-linear models for improved dialogue act classification", IEEE International Conference On Acoustics Speech and Signal Processing, 2013, XP032507868,, 6 pages.
Chen, Yun-Nung et al., "An empirical investigation of sparse log-linear models for improved dialogue act classification", 2013 IEEE International Conference on Acoustics. Speech and Signal Processing. IEEE., 2013, 6 pages.
Chen, Yun-Nung , "An empirical investigation of sparse log-linear models for improved dialogue act classification.", 2013 IEEE International Conference on Acoustics, Speech and Signal Processing. IEEE, 2013, pp. 1-6.
Cheng, Yong et al., "Semi-Supervised Learning for Neural Machine Translation", CoRR abs/1606.04596, http://arxiv.org/abs/1606.04596, Dec. 10, 2016, 10 pages.
Collados, Jose C. , "On the contribution of neural networks and word embeddings in Natural Language Processing", published at Medium.com, Jan. 2018. (Year: 2018), http://www.josecamachocollados.com, Jan. 2018, pp. 1-7.
Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.
De La Briandais, Rene , "File Searching Using Variable Length Keys", Proceedings of the 1959 Western Joint Computer Conference, https://pdfs.semanticscholar.org/3ce3/f4cc1c91d03850ed84ef96a08498e018d18f.pdf, 1959, pp. 295-298.
Deerwester, Scott et al., "Improving Information Retrieval with Latent Semantic Indexing", Proceedings of the 51st ASIS Annual Meeting (ASIS '88), vol. 25, Oct. 1988, pp. 36-40.
Deerwester, Scott et al., "Indexing by Latent Semantic Analysis", Journal of the Association for Information Science and Technology, vol. 41, iss. 6, Sep. 1990, pp. 391-407.
Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.
Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.
Goodfellow, Ian J et al., "Generative Adversarial Nets", Advances in Neural Information Processing Systems 27 (NIPS 2014), https://papers.nips.cc/paper/5423-generative-adversarial-nets.pdf, 2014, p. 2672-2680.
Gray, R. , "Vector quantization", IEEE ASSP Magazine, vol. 1, iss. 2 https://ieeexplore.ieee.org/document/1162229/ (abstract only), Apr. 1984, pp. 4-29.
Henderson, Matthew et al., "Efficient Natural Language Response Suggestion for Smart Reply", arXiv:1705.00652v1, https://arxiv.org/pdf/1705.00652.pdf (accessed Aug. 15, 2018), May 1, 2017, 15 pages.
Hochreiter, Sepp et al., "Long Short-Term Memory", Neural Computation, vol. 9, iss. 8, 1997, pp. 1735-1780.
Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.
Hu, Baotian et al., "Convolutional Neural Network Architectures for Matching Natural Language Sentences", CoRR, abs/1503.03244, 2015, 9 pages.
Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.
Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.
Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.
Kannan, Anjuli et al., "Smart Reply: Automated Response Suggestion for Email", CoRR, abs/1606.04870, Jun. 15, 2016, 10 pages.
Karpathy, Andrej , "The Unreasonable Effectiveness of Recurrent Neural Networks", http://karpathy.github.io/2015/05/21/rnn-effectiveness/, (accessed on Sep. 20, 2016), May 21, 2015, 42 pages.
Kim, Yoon et al., "Character-Aware Neural Language Models", CoRR abs/1508.06615, http://arxiv.org/abs/1508.06615, 2015, 9 pages.
Kim, Yoon , "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kiros, Ryan et al., "Skip-Thought Vectors", Proceedings of the 28th International Conference on Neural Information Processing Systems, vol. 2., 2015, pp. 3294-3302.
Kuo, Hong-Kwang J. et al., "Advances in natural language call routing", Bell Labs Technical Journal, vol. 7, No. 4, doi: 10.1002/bltj.10040., 2003, pp. 155-170.
Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.
Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learni ng_2015_CVPR_paper.pdf, 2015 (accessed Jan. 3, 2017), pp. 3270-3278.

(56) References Cited

OTHER PUBLICATIONS

Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.

Lample, Guillaume et al., "Unsupervised Machine Translation Using Monolingual Corpora Only", CoRR abs/1711.00043, http://arxiv.org/abs/1711.00043, Oct. 31, 2017, 12 pages.

Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, p. 2708-2716.

Le, Quoc et al., "Distributed Representations of Sentences and Documents", Proceedings of the 31st International Conference on Machine Learning, W&CP vol. 32, Beijing, China, 2014, 9 pages.

Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.

Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, p. 2177-2185.

Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp. 1106-1115.

Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.

Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.

Liu, Bingquan et al., "Content-Oriented User Modeling for Personalized Response Ranking in Chatbots", IEEE/ACM Transactions on Audio, Speech, and Language Processing, vol. 26, No. 1,, Feb. 2018, pp. 122-133.

Logeswaran, Lajanugen et al., "An Efficient Framework for Learning Sentence Representations", International Conference on Learning Representations, https://openreview.net/pdf?id=rJvJXZbOW, 2018, 16 pages.

Logeswaran, Lajanugen et al., "An efficient framework for learning sentence representations", ICLR 2018 Conference Blind Submission, https://openreview.net/pdf?id=rJvJXZb0W (accessed Nov. 26, 2018), Feb. 15, 2018, 16 pages.

Miao, Yishu et al., "Neural Variational Inference for Text Processing", CoRR abs/1511.06038, http://arxiv.org/abs/1511.06038, 2015, 15 pages.

Mikolov, Tomas et al., "Distributed Representations of Words and Phrases and their Compositionality", CoRR abs/1310.4546, http://arxiv.org/abs/1310.4546, 2013, 9 pages.

Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, Tomas et al., "Recurrent neural network based language model", Interspeech 2010, Sep. 26-30, 2010, Makuhari, Chiba, Japan, 2010, pp. 1045-1048.

Mikolov, Tomas et al., "Recurrent neural network based language model", INTERSPEECH 2010, Makuhari, Chiba, Japan, accessed at http://www.fit.vutbr.cz/research/groups/speech/publi/2010/mikolov_interspeech2010_IS10 0722.pdf, Sep. 26-30, 2010 (accessed on Jan. 3, 2017), pp. 1045-1048.

Miller, Alexander et al., "Key-Value Memory Networks for Directly Reading Documents", 2016, 10 pages.

Muhler, Vincent , "Building a Node.js WebSocket Chat App with Socket.io and React", Tutorial to Socket.io with JavaScript, Feb. 22, 2018, 12 pages.

Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.

PCT/US2016/049896, , "Application Serial No. PCT/US2016/049896, International Search Report and the Written Opinion mailed May 19, 2017", 14 pages.

PCT/US2016/049896, , "International Application Serial No. PCT/US2016/049896, International Preliminary Report on Patentability mailed Jan. 17, 2019", ASAPP, Inc., 9 pages.

PCT/US2017/040205, , "Application Serial No. PCT/US2017/040205, International Search Report and the Written Opinion mailed Sep. 15, 2017", 11 pages.

PCT/US2017/040205, , "International Application Serial No. PCT/US2017/040205, International Preliminary Report on Patentability mailed Jan. 17, 2019", ASAPP, Inc., 9 pages.

PCT/US2018/064404, , "International Application Serial No. PCT/US2018/064404, International Preliminary Report on Patentability mailed Jun. 18, 2020", ASPP, Inc., 9 pages.

PCT/US2018/064404, , "International Application Serial No. PCT/US2018/064404, International Search Report and Written Opinion mailed Feb. 25, 2019", ASAPP, Inc., 9 pages.

PCT/US2019/014569, , "International Application Serial No. PCT/US2019/014569, International Search Report and Written Opinion mailed Mar. 4, 2019", ASAPP, Inc., 13 pages.

Pennington, Jeffrey et al., "GloVe: Global Vectors for Word Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, p. 1532-1543.

Rush, Alexander M. et al., "Optimal Beam Search for Machine Translation", Proceedings of EMNLP 2013, Oct. 18-21, 2013, Seattle, Washington, USA, 2013, 12 pages.

Scott, Tyler R. et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.

See, Abigail et al., "Get To The Point: Summarization with Pointer-Generator Networks", CoRR abs/1704.04368, http://arxiv.org/abs/1704.04368, Apr. 25, 2017, 20 pages.

Shen, Tianxiao et al., "Style Transfer from Non-Parallel Text by Cross-Alignment", CoRR abs/1705.09655, http://arxiv.org/abs/1705.09655, Nov. 6, 2017, 12 pages.

Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.

Sneiders, Eriks , "Automated question answering: template-based approach", Department of Computer and Systems Sciences, Royal Institute of Technology and Stockholm University (PhD dissertation, Data-och systemvetenskap), retrieved from http://urn.kb.se/resolve?urn=urn:nbn:se:kth:diva-3300, Feb. 2002, 285 pages.

Snell, Jake et al., "Prototypical Networks for Few-shot Learning", arXiv:1703.05175v2 [cs.LG], https://arxiv.org/pdf/1703.05175.pdf, Jun. 19, 2017, 13 pages.

Sutskever, Ilya et al., "Sequence to Sequence Learning with Neural Networks", CoRR abs/1409.3215, http://arxiv.org/abs/1409.3215, 2014, 9 pages.

Tai, Kai S. et al., "Improved Semantic Representations From Tree-Structured Long Short-Term Memory Networks", arXiv:1503.00075v3 [cs.CL], https://arxiv.org/pdf/1503.00075v3.pdf (accessed on Jan. 3, 2017), May 30, 2015, 11 pages.

Ustinova, Evgeniya et al., "Learning Deep Embeddings with Histogram Loss", arXiv:1611.00822v1 [cs.CV], https://arxiv.org/pdf/1611.00822.pdf, Nov. 2, 2016, 9 pages.

Vincent, Pascal et al., "Extracting and Composing Robust Features with Denoising Autoencoders", Proceedings of the 25th International Conference on Machine Learning, Helsinki, Finland, http://

(56) References Cited

OTHER PUBLICATIONS www.cs.toronto.edu/~larocheh/publications/icml-2008-denoising-autoencoders.pdf (accessed on Nov. 26, 2018), 2008, 8 pages.

Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.

Mnyals, Oriol et al., "A Neural Conversational Model", CoRR abs/1506.05869, http://arxiv.org/abs/1506.05869, 2015, 8 pages.

Wang, Peilu et al., "Word embedding for recurrent neural network based TTS synthesis", 2015 IEEE International Conference on Acoustics, Speech and Signal Processing (ICASSP), doi: 10.1109/ICASSP.2015.7178898, 2015, pp. 4879-4883.

Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.

Weng, Sung-Shun et al., "Using text classification and multiple concepts to answer e-mails", Expert Systems with Applications, vol. 26, issue 4, May 2004, pp. 529-543.

Xiao, Yijun et al., "Efficient Character-level Document Classification by Combining Convolution and Recurrent Layers", CoRR abs/1602.00367, https://arxiv.org/pdf/1602.00367.pdf, Feb. 1, 2016, 10 pages.

Yu, Mo et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.

Zhang, Xiang et al., "Character-level Convolutional Networks for Text Classification", CoRR abs/1509.01626, http://arxiv.org/abs/1509.01626, 2015, 9 pages.

Zhao, Han et al., "Self-Adaptive Hierarchical Sentence Model", CoRR abs/1504.05070, http://arxiv.org/abs/1504.05070, Apr. 27, 2015, 8 pages.

Delashmit, et al., "Recent Developments in Multilayer Perceptron Neural Networks", Proceedings of the the 7th Annual Memphis Area Engineering and Science Conference MAESC, 2005, 15 pages.

Dong, et al., "Question Answering over Freebase with Multi-Column Convolutional Neural Networks", In Proceedings of the 53rd Annual Meeting of the Association for Computational Linguistics and the 7th International Joint Conference on Natural Language Processing, Beijing, China, Jul. 26-31, 2015, pp. 260-269.

\* cited by examiner

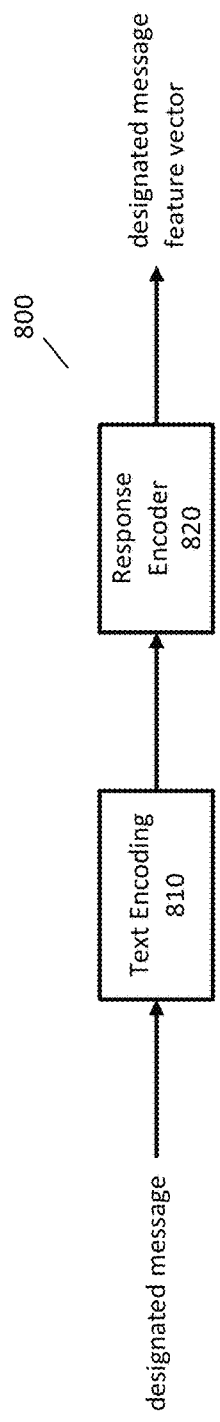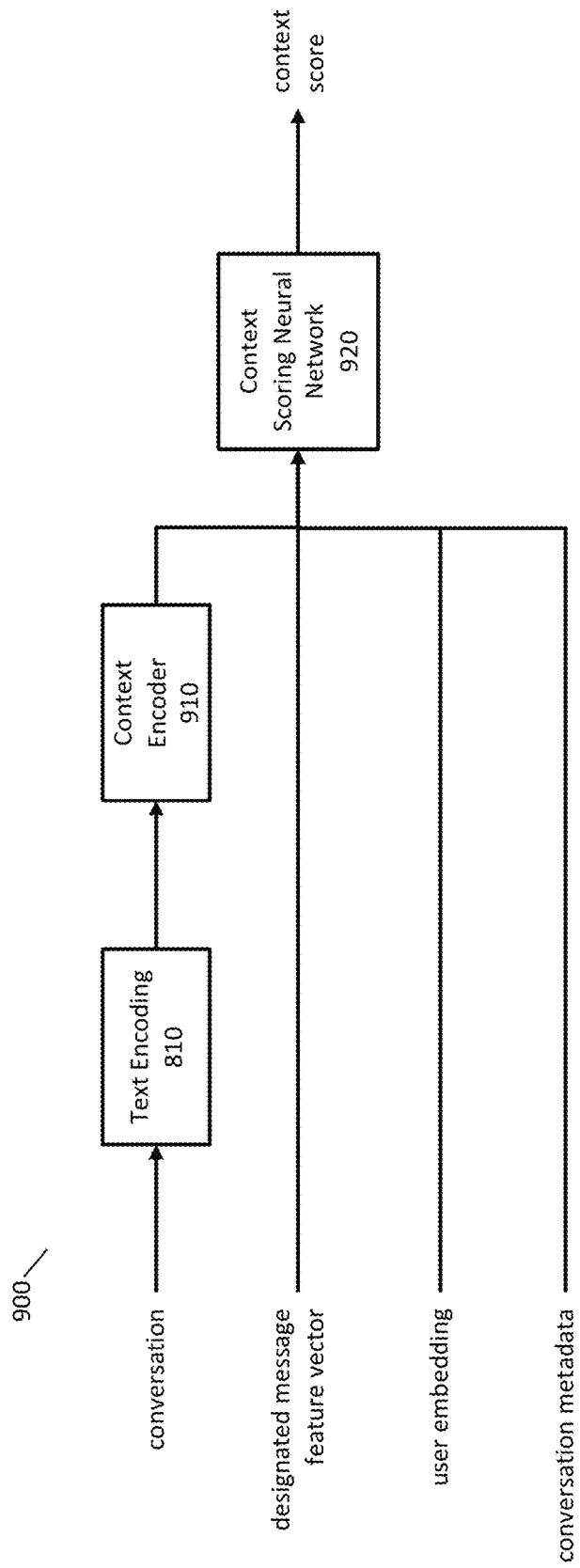

CUSTOMIZED MESSAGE SUGGESTION WITH USER EMBEDDING VECTORS

CROSS REFERENCE TO RELATED APPLICATION

This application is a continuation of U.S. patent application Ser. No. 16/663,872, filed Oct. 25, 2019, and entitled "CUSTOMIZED MESSAGE SUGGESTION WITH USER EMBEDDING VECTORS."

The foregoing application is incorporated herein by reference in its entirety.

BACKGROUND

People may exchange messages for various purposes, such as friends coordinating social events or a customer of a company seeking support from a company. The process of entering a message may be cumbersome, especially when a person is busy, multitasking, or using a mobile device with less convenient input capabilities. To make it easier for a person to send a message, it may be desired to present suggested messages to the person so that the person may select a suggested message instead of needing to enter a message.

BRIEF DESCRIPTION OF THE FIGURES

The invention and the following detailed description of certain embodiments thereof may be understood by reference to the following figures:

FIG. 8 is an example system for computing designated message feature vectors.

FIG. 9 is an example system for computing context scores for designated messages.

DETAILED DESCRIPTION

Figure 1C:
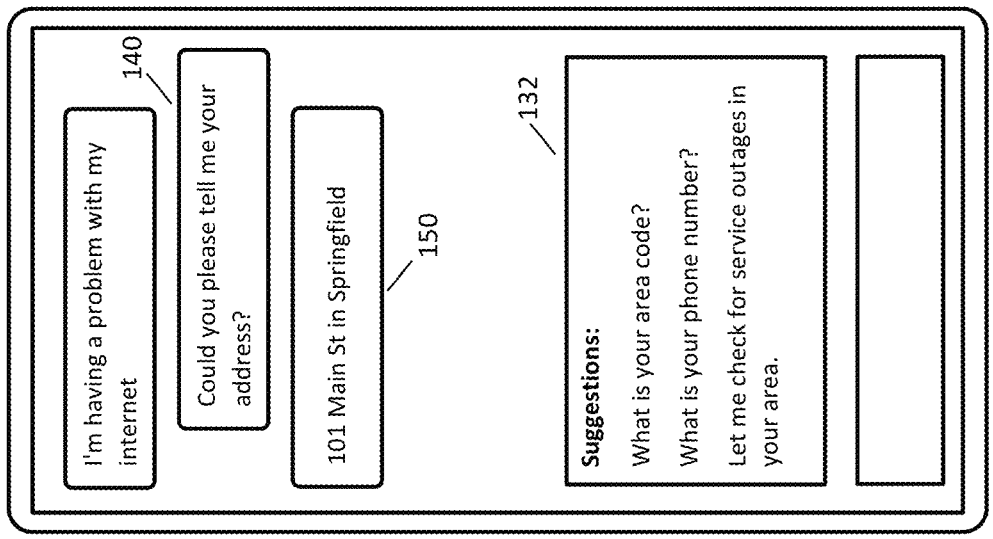
FIGS. 1A-C are example user interfaces for suggesting a message to a user.

People may exchange messages with each other using a variety of techniques and in a variety of situations. For example, a person may type or speak a message to an app running on his device, type or speak a message on a web page, send a text message, or send an email. As used herein, a text message includes any message sent as text including but not limited to a message sent using SMS (short message service) or a special-purpose application (e.g., Facebook messenger, Apple iMessage, Google Hangouts, or WhatsApp). People may exchange messages for any appropriate purpose, such as social interactions, business interactions, or to request customer support from a company. The techniques described herein are not limited to any manner of or purpose for exchanging messages.

Entering a message may be cumbersome as compared to speaking directly with a person. For example, entering a message with a keyboard, touchscreen, or even dictating a message using automatic speech recognition may take more time and attention than desired and may contain errors or typos. Message entry through a limited interface, such as with a mobile device, may make these challenges even more acute, and may introduce other challenges for the user to send a message as intended (e.g., due to difficulty in reading the intended message and/or correcting errors after initial entry).

To facilitate the process of entering a message and/or ensuring that an entered message is correct, one or more suggested messages may be presented to a person. Messages may be suggested to a person based on the context of the conversation. For example, a user may receive a message "How are you?" and a suggested response may be "I am fine." These suggested messages may be updated throughout the conversation as additional messages are exchanged.

Messages may also be suggested based on a partial message input by a user. A person may begin to enter a message by entering one or more words of the message. While the user is entering the one or more words, suggested messages may be presented to the person. For example, in response to the above received message, a user may enter "Splen" and a suggested response may be "Splendid!" The suggested messages may be updated as additional portions of partial messages are entered by a user.

The process of suggesting messages to a person may be improved by using a set of designated messages. A set of designated messages may include a set of all messages that may be suggested to a person. For example, where messages are suggested in the context of a customer seeking support from a company, the set of designated messages may include a number of most common messages from logs of customer support sessions. The number of designated messages may be small or large, such as obtaining 10,000 designated messages from customer support logs. As described in greater detail below, a mathematical model (such as an artificial neural network) may process previous messages in a conversation and/or a partial message entered by a user to select one or more designated messages as suggestions for a user.

Suggesting messages from a set of designated messages may provide benefits when suggesting messages to users. For example, the set of designated messages may be reviewed to prevent the suggestion of inappropriate messages (e.g., profanity), messages with poor grammar, or ambiguous messages. A set of designated messages may also be crafted so that suggested messages have a desired tone or level of formality. In some implementations, the use of designated messages may allow for additional capabilities, such as replacing one or more text portions of a partial entry by a user, rather than merely auto-completing a message limited to the text already entered by the user.

The process of suggesting messages to a user may also be improved by customizing, adapting, or tailoring the suggestions to the user. Different users may have different preferences for the tone or style of messages they send, such as more formal or more playful. Knowing the preferences of an individual user allows the suggestion of messages that are more likely to be accepted by the user. The suggestion of messages to a user may be adapted to the preferences of the user by using a user embedding vector as described in greater detail below. For example, a user embedding vector may be learned from a history of previous messages sent by the user, and a mathematical model may process the user embedding vector when selecting suggested messages for the user.

The techniques described herein may use any of the techniques described in U.S. patent application Ser. No. 16/035,062 and U.S. patent application Ser. No. 16/054,473, each of which is incorporated herein by reference.

Figure 1B:
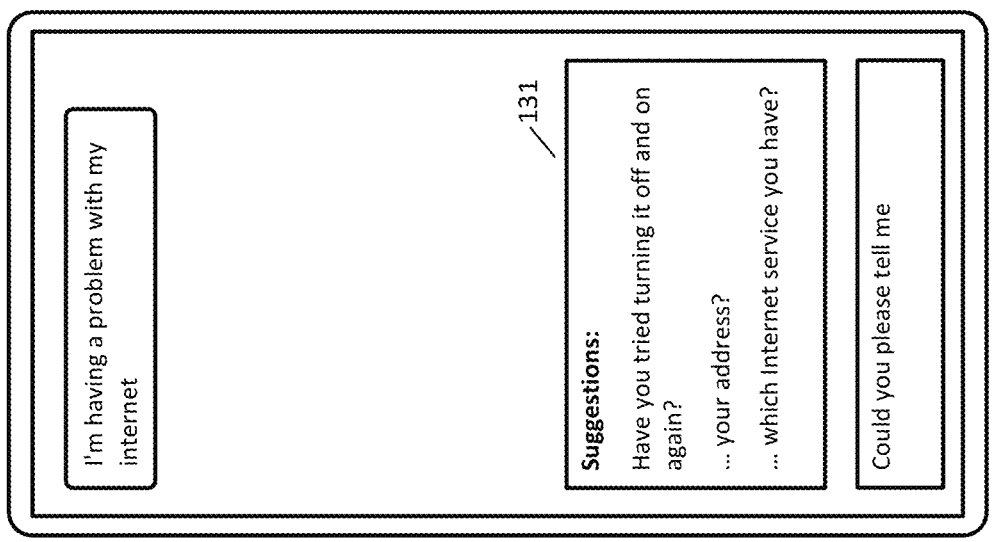
Figure 1A:
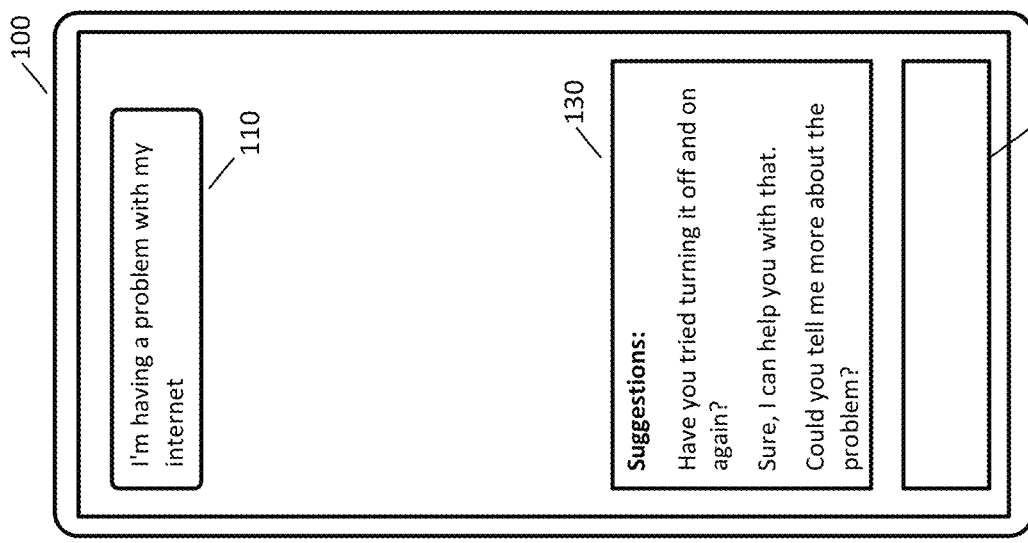

FIGS. 1A-C illustrate an example of suggesting messages to a user. In FIGS. 1A-C, a customer is requesting customer support using customer device 100 (e.g., a smart phone), and several messages between the company and a customer support agent are shown. In this example, suggested messages are presented to the agent. FIGS. 1A-C are non-limiting examples, and the techniques described herein are not limited to this example of providing customer service.

In FIG. 1A, a customer has opened an application to request customer service from a company. The customer has transmitted message 110 to the agent that states "I'm having a problem with my interne." The agent may respond to the customer by entering a message in message input box 120. Before the agent has started entering a message, however, suggestions may be presented to the agent in suggestion box 130. These suggestions may be tailored to the preferences of the agent so that different agents may receive different suggestions in response to an identical message received from a customer. The agent may use one of the suggested messages (e.g., by tapping it or selecting with a mouse) or the agent may enter a different message in message input box 120.

In FIG. 1B, the agent has not selected a suggested message, and the agent has instead started entering the message "Could you please tell me". In response to this entered text, the suggestions are updated as shown in suggestion box 131. These suggestions may also be tailored to the preferences of the agent. After the agent has started entering a message, the suggestions may include complete messages (such as the messages from suggestion box 130) and may include completions to what the agent has started typing. In the example of FIG. 1B, the suggested completions are indicated by a leading ellipsis. The agent may select a suggestion or continue typing. In the example of FIG. 1B, it can be seen that the suggestions do not need to include, and in some instances may not include, the partial text entered by the agent.

In FIG. 1C, the agent has selected the completion " . . . your address" and in response the completed message was sent to the customer as message 140. The customer then responded with message 150 that provided the customer's address. In response to receiving message 150 from the customer, suggestion box 132 shows a new set of suggested messages. These suggested messages may again be tailored to the preferences of the agent. As above, the agent may select a suggested message or may start typing to receive suggested completions of a partially entered message.

Figure 2:
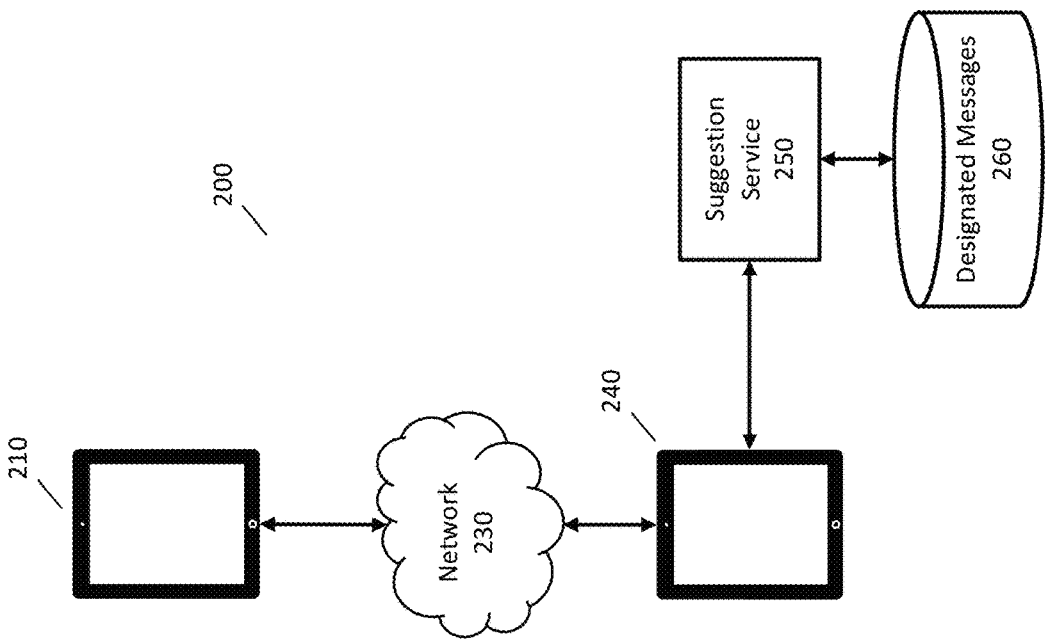
FIG. 2 is an example system for suggesting a message to a user.

FIG. 2 is an example system 200 for suggesting messages to a user. In system 200, a first user may use device 210 to transmit a message to a second user. The message may be transmitted using network 230, which may be any appropriate network such as the Internet or cellular data network.

A second user may receive the message at device 240. The second user may use suggestion service 250 to receive suggestions of messages to send back to the first user. The suggestions may be presented to the second user before the second user has entered a message and/or while the second user is entering a message as described above. Suggestion service 250 may obtain suggested messages from designated messages data store 260, which may store a set of designated messages that may include all messages that may be suggested to the second user. Suggestion service 250 may perform any of the techniques described herein to determine one or more suggested messages to present to the second user, such as tailoring the suggestion of messages to the preferences of the second user.

Figure 3:
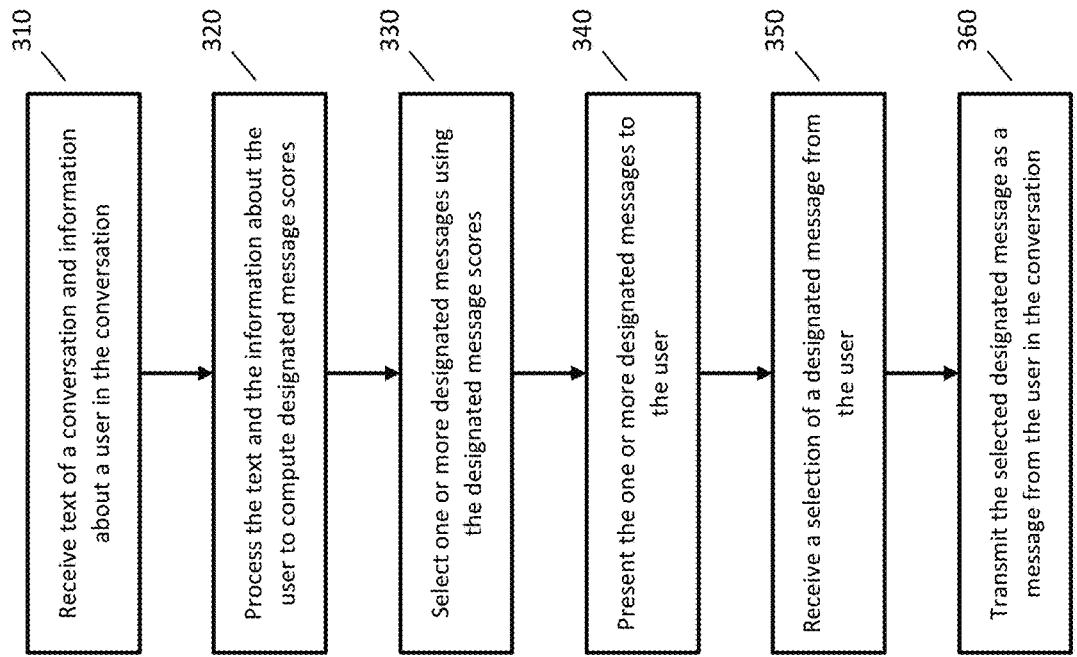
FIG. 3 is a flowchart of an example method for suggesting a message to a user.

FIG. 3 is a flowchart of an example method for suggesting messages to a user. In FIG. 3 and other flowcharts herein, the ordering of the steps is a non-limiting example and other orders are possible, not all steps are required, and steps may be combined or divided. The methods described by any flowcharts described herein may be implemented, for example, by any of the computers or systems described herein.

At step 310, text of a conversation and information about a user in the conversation is received. The text of the conversation may include text of one or more previous messages and text that has been entered by a user before the user has sent the text as a message. Where a message includes audio, automatic speech recognition may be used to obtain text corresponding to the audio. The information about the user may include any information that identifies the user, such as a user identification or user ID.

At step 320, the text of the conversation and the information about the user is processed with a mathematical model to compute designated message scores for a set of designated messages. A designated message score for a designated message may indicate the suitability of the designated message as a suggestion in the current point of the conversation. The information about the user may be used to obtain a user embedding, as described in greater detail herein, and this user embedding may be used to tailor the suggestions to the preferences of the user.

At step 330, one or more designated messages are selected from a set of designated messages using the designated message scores. For example, one or more highest scoring designated messages may be selected or all designated messages with a score above a threshold may be selected.

At step 340, the selected one or more designated messages are presented to the user, such as presented in FIGS. 1A-C. At step 350, a selection of a suggested message is received from the user. For example, an indication (such as an AJAX request or an HTML post) may be received that identifies a selected suggested message. At step 360, the selected suggested message is transmitted as a message from the user in the conversation.

Designated Messages

To suggest messages as described above, a data store of designated messages may need to be created. When suggesting messages, the possible suggested messages may be limited to a set of designated messages. A set of designated messages may be created to cover most likely messages that a user would like to send. Selecting messages from a set of designated messages may provide assurance that undesirable or improper messages are not suggested to a user (such as messages with improper grammar or profanity).

Any appropriate techniques may be used to create a data store of designated messages, such as creating designated messages manually. In some implementations, a corpus of existing messages may be used to create designated messages. Any appropriate corpus of messages may be used, such as corpus of messages logged from a messaging application or a corpus of messages logged from customer service sessions.

Figure 4:
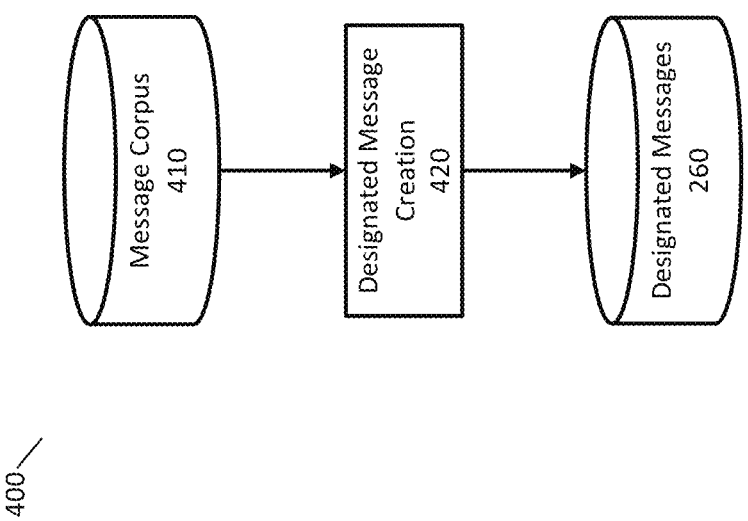
FIG. 4 is an example system for creating a set of designated messages from a message corpus.

FIG. 4 illustrates an example system 400 for obtaining a data store of designated messages from a corpus of messages. In FIG. 4, message corpus data store 410 may include any appropriate messages from which designated messages may be obtained. Designated message creation component 420 may process the messages in message corpus data store 410 to generate a set of designated messages and store the set of designated messages in designated messages data store 260. Designated message creation component 420 may use any appropriate techniques, such as any of the techniques described in FIG. 5 or elsewhere herein.

Figure 5:
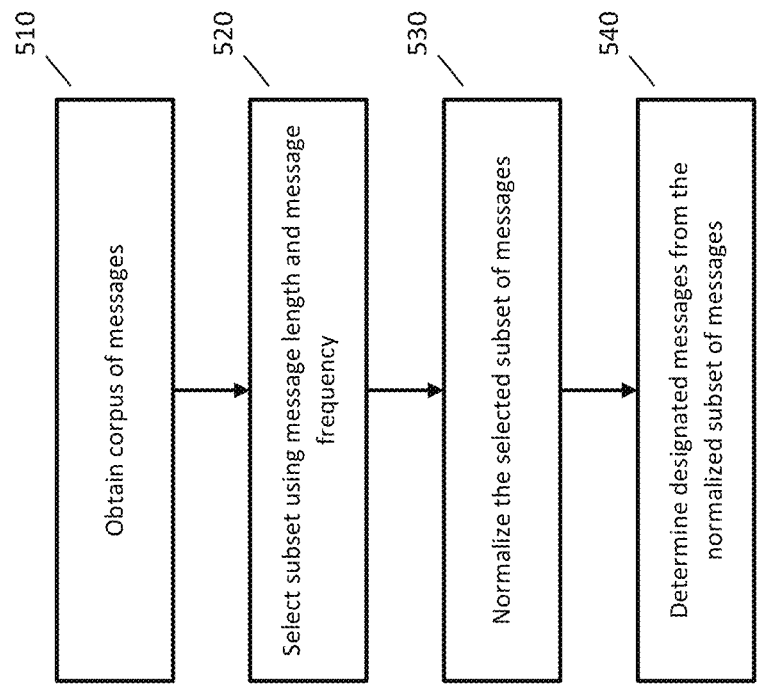
FIG. 5 is a flowchart of an example method for creating a set of designated messages.

FIG. 5 is a flowchart of an example method for determining a set of designated messages from a corpus of messages. At step 510, a corpus of messages is obtained, such as any corpus of messages described herein.

At step 520, a subset of the corpus of messages is selected. Any appropriate techniques may be used to select the subset of messages. For example, the following factors may be considered when selecting messages: the length of a message, the number of times the message appears in the corpus of messages, or a probability of the message occurring as determined using a language model.

In some implementations, all messages with a number of characters less than a character cutoff may be selected. For example, the character cutoff may be determined by considering tradeoffs of message length versus coverage of the messages in the message corpus. In some implementations, a character cutoff may be determined by ordering messages in a message corpus from shortest to longest and determining a set of shortest messages that provide a desired coverage of the entire message corpus, such as 80% coverage. The character cutoff may be determined as the number of characters in the longest message of the set providing the desired coverage.

In some implementations, the selected character cutoff may be adjusted to improve the quality of suggested messages. For example, a similarity score of messages in the selected subset of the corpus of messages may be used to adjust the character cutoff. Where the selected messages are too similar, the character cutoff may be increased to consider a larger subset of the corpus of messages, or where the number of selected messages is too large, the number of characters may be decreased to select a smaller subset of the corpus of messages.

At step 530, the selected subset of messages is normalized. Any appropriate normalization techniques may be used, such as normalizing capitalization, removing punctuation, removing greetings ("hi," "hello," or "please"), or replacing words (e.g., replacing "u" with "you"). Messages that are the same after normalization may be combined. When performing the normalization, a frequency or count of the original messages corresponding to each normalized message may be maintained. For example, where two messages are identical after normalization but were not identical before normalization (e.g., one contains "you" and the other contains "u"), the normalized message may be stored with a frequency of two.

At step 540, the set of designated messages is determined from the normalized subset of messages. Any appropriate techniques may be used to determine the set of designated messages, such as selecting the normalized messages that appear most frequently in the corpus of messages.

The performance of a deployed system may be evaluated (e.g., determining how often suggested messages are selected by users or whether users edit suggested messages), and processing of FIG. 5 may be adjusted to improve performance. For example, a character cutoff may be adjusted to determine if performance would be improved with a higher or lower character cutoff in selecting the set of designated messages.

In some implementations, an intent classifier may be used when determining the set of designated messages from the normalized subset of messages. For example, it may be desired that the set of designated messages include at least one designated message for each intent of the intent classifier. In some implementations, a number of most frequent normalized messages may be selected, and an intent may be determined for each of the selected normalized messages. Where there are no normalized messages for an intent, one or more additional normalized messages may be selected to ensure that each intent has at least on normalized message. For example, designated messages may be selected using a submodular maximization algorithm, such as the algorithm described in Multi-document summarization via budgeted maximization of submodular functions, HLT '10 Human Language Technologies: The 2010 Annual Conference of the North American Chapter of the Association for Computational Linguistics, pp. 912-920, which is herein incorporated by reference in the entirety.

In some implementations, submodular maximization may be used at step 540 to determine the set of designated messages. Submodular maximization may improve the determination of the set of designated messages in that it may avoid selecting highly similar messages (e.g., "I want to make a payment" and "I need to make a payment") and also help ensure that the designated messages cover many different types of messages that may be desired by users.

After a set of designated messages has been determined, it may be stored in a data store, such as designated messages data store 260.

Message Selection

Figure 6:
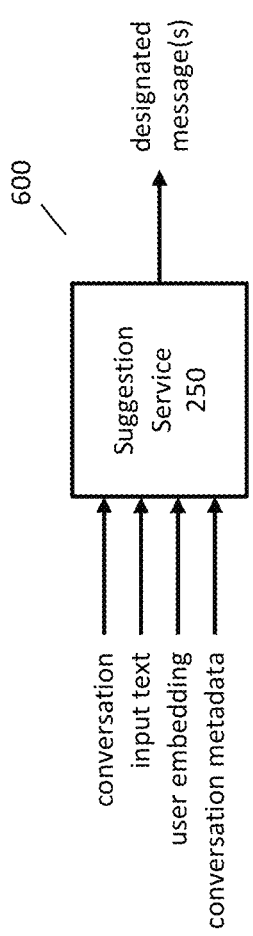
FIG. 6 is an example system for implementing a suggestion service.

FIG. 6 is an example system 600 that may be used to suggest messages for a user. In FIG. 6, suggestion service 250 may receive one or more inputs relating to the conversation and select one or more designated messages as suggested messages for a user.

Suggestion service 250 may receive text of messages of the conversation as input. The text of messages of the conversation provide information about the subject matter of the conversation and this text may be used to select designated messages that are related to the conversation.

Suggestion service 250 may receive text input by a user but that has not yet been sent by the user, such as partial text of a message. This input text provides information about what message the user would like to send, and thus may be used to select messages that are close (either by text match or by meaning) to input text.

Suggestion service 250 may receive a user embedding corresponding to the user for whom messages are being suggested. A user embedding is a vector in a vector space that represents the preferred message style of a user. For example, some users may prefer short messages, long messages, messages with slang, formal messages, or messages that are fun or light hearted. User embeddings for users with similar message preferences may be close to each other in this vector space, and user embeddings for users with different message preferences may be far from each other in this vector space. The contents of the user embedding (e.g., the numerical values) may not otherwise be meaningful to a person. User embeddings may be computed for users as described in greater detail below.

Suggestion service 250 may receive conversation metadata. Conversation metadata may include any metadata that relates to the conversation or to users participating in the conversation. For example, conversation metadata may include a time or date of the conversation, locations of users, a role of a user (e.g., a user is assigned to handle customer support for billing issues), or a frequency with which a user has sent individual designated messages of the set of designated messages.

Suggestion service 250 may additionally process any other information that may be used to select one or more designated messages as a suggestion for a user.

Figure 7:
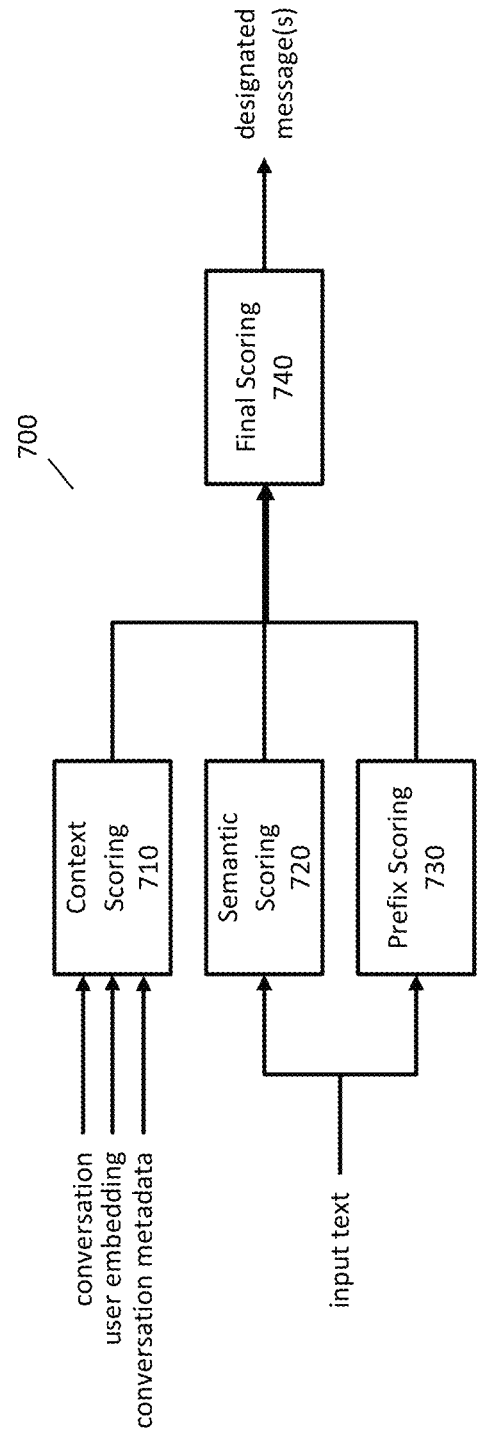
FIG. 7 is an example system for implementing a suggestion service with one or more designated message scores.

FIG. 7 provides additional details an example system 700 that may be used to suggest messages for a user. In FIG. 7 designated messages may be selected according to different criteria (e.g., conversation context, semantic match, and/or prefix match), and the criteria may be combined to make a final selection of designated messages. In some implementations, not all of the criteria may be used (e.g., only context scoring may be used and thus no need for a final scoring) or additional criteria may be used.

Context scoring component 710 may process one or more of text of the conversation, a user embedding of the user for whom messages are being suggested, and conversation metadata. Context scoring component 710 may then output a context score for one or more designated messages. A context score for a designated message may indicate the suitability of the designated message given the meaning of the previous text of the conversation.

Semantic scoring component 720 may process the input text entered by the user (but not yet sent as a message) and compute a semantic score for one or more designated messages. A semantic score for a designated message may indicate a similarity in meaning between the input text and the designated message.

Prefix scoring component 730 may process the input text entered by the user and compute a prefix score for one or more designated messages. For example, a prefix score for a designated message may be zero if the input text is not a prefix of the designated message and may be non-zero if the input text is a prefix of the designated message.

Final scoring component 740 may process one or more of the context scores, semantic scores, and prefix scores to compute final scores for one or more designated messages. A final score for a designated message may be computed from one or more of the context score, the semantic score, and the prefix score of the designated message. The final scores may then be used to select one or more designated messages as suggested messages for the user. Final scoring component 740 may compute a final score for a designated message using any appropriate techniques. For example, final scoring component 740 may compute a weighted sum, maximum, average, median, or any other statistic of the received scores for the designated message (e.g., context score, semantic score, and prefix score). In some implementations, a semantic score for a designated message may only be used if the prefix score for the designated message is zero (indicating that the input text is not a prefix for the designated message).

In some implementations, final scoring component 740 may select a fixed number of designated messages having the highest final scores or select all designated messages having a final score above a threshold. In some instances, final scoring component 740 may not select any messages, such as when all designated messages have scores below a threshold. The one more designated messages selected by final scoring component 740 may then be presented as suggestions to a user using any appropriate techniques, such as those presented in FIGS. 1A-C.

Designated Message Feature Vectors

In some implementations, a designated message may be represented as a designated message feature vector to facilitate the computation of the scores described above. FIG. 8 is an example system 800 that may be used to compute a designated message feature vector from the text of a designated message.

In FIG. 8, text encoding component 810 may process the text of a designated message to compute or obtain a representation of the text of the designated message. Any appropriate text encoding may be used such as word embeddings or byte pair encoding.

A word embedding is a vector in a vector space that represents the word but does so in a manner that preserves useful information about the meaning of the word. For example, the word embeddings of words may be constructed so that words with similar meanings or categories may be close to one another in the vector space. For example, the word embeddings for "cat" and "cats" may be close to each other because they have similar meanings, and the words "cat" and "dog" may be close to each other because they both relate to pets. Word embeddings may be trained in advance using a training corpus, and when obtaining the word embeddings, a lookup may be performed to obtain a word embedding for each word of the message.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec or GloVe software. A word embedding may accordingly be created for each word in the vocabulary. In some implementations, word embeddings that include information about the characters in the words may be used, such as the word-character embeddings described in U.S. patent application Ser. No. 15/964,629, which is incorporated herein by reference in the entirety.

A set of word embeddings may be determined from a vocabulary of words, such as the 50,000 most common words from a training corpus, and a word embedding may be computed for each word of the vocabulary. A word that is not in the vocabulary is an out-of-vocabulary word (OOV word). In some implementations, an additional embedding may also be added to represent all OOV words.

With byte-pair encoding, each word may be represented by a sequence of one or more tokens where each token represents the word or a portion of the word (e.g., a token may represent one or more characters). Any appropriate techniques may be used to determine the sequence of tokens to represent words of a vocabulary.

In some implementations, an iterative process may be used where the tokens are initialized to the letters or characters of the alphabet (e.g., a-z, A-Z, and possibly other characters such as digits or punctuation). At each iteration, counts of pairs of adjacent tokens may be determined, and a most frequently occurring pair of tokens may be merged into a single token. For example, at a first iteration the token "s" followed by "t" may be the most frequent pair, and instances of this pair may be replaced by the token "st". This process may be repeated until a desired stopping point has been reached, such as a total number of iterations.

The final set of tokens may then be used to represent the words of the conversation. In some implementations, each word of the conversation may be replaced by a sequence one or more tokens. In some implementations, further processing may be performed. A token embedding vector may be computed for each of the tokens, and each word of the conversation may be represented by a sequence of token embedding vectors corresponding to the tokens of the word.

Response encoder component 820 may process the text encoding of the designated message and compute a designated message feature vector that represents the designated message in a vector space (that may be a different vector space used for the word embeddings, such as having a different dimension). Response encoder component 820 may process the text encodings using any appropriate neural network, such as a recurrent neural network (or a bidirectional recurrent neural network or a neural network with a long short-term memory component).

In some implementations, response encoder component 820 may compute a designated message feature vector as follows:

$$h_t = \sigma_h(U_h x_t + V_h h_{t-1} + b_h)$$

where $x_t$ is a representation of the $t^{th}$ word or token, $h_t$ is a hidden state corresponding to the $t^{th}$ word, $h_0$ is an initial state vector, $\sigma_h$ is an activation function (e.g., tanh or a sigmoid), and $U_h$, $V_h$, and $b_h$ are matrices or vectors of parameters. The designated message feature vector may correspond to the hidden state computed after processing the final word or token of the input message.

Response encoder component 820 then outputs a designated message feature vector for the input designated message. System 800 may be used to compute a designated message feature vector for each available designated message. In some implementations, the designated message feature vectors may be computed in advance to improve runtime performance of a system for suggesting messages.

Response encoder component 820 may be trained using any appropriate techniques, such as any of the techniques described in U.S. patent application Ser. No. 16/035,062 and U.S. patent application Ser. No. 16/054,473, each of which is incorporated herein by reference in the entirety.

Context Scoring

FIG. 9 is an example system 900 that may be used to compute a context score for a designated message. In some implementations, context scoring component 710 of FIG. 7 may be implemented using system 900.

In FIG. 9, the inputs for computing a context score for a designated message may include text of one or more messages of a conversation, a designated message feature vector corresponding to the designated message, a user embedding, and/or conversation metadata.

The text of the one or more messages of the conversation may be processed to compute a conversation feature vector that represents the meaning of the conversation. A conversation feature vector is a vector in a vector space that represents the subject matter or the meaning of the messages in the conversation. Conversation feature vectors for similar conversations may be close to each other in this vector space, and conversation feature vectors for conversations with different subject matters may be far from each other in this vector space. The contents of a conversation feature vector (e.g., the numerical values) may not otherwise be meaningful to a person.

The conversation feature vector may be computed by processing the text of the conversation with text encoding component 810 to obtain a representation of the text. In some implementations, a text encoding component may be used that is different from text encoding component 810 as used in FIG. 8 (e.g., word embeddings may be used instead of byte-pair encodings).

The text encoding may then be processed by context encoder 910 to compute the conversation feature vector. Context encoder 910 may sequentially process the text encodings of the conversation (e.g., processing the first word of the first message, the second word of the first message, and so forth until all text encodings are processed).

Context encoder 910 may use any appropriate mathematical models to compute conversation feature vector from the text encodings. For example, context encoder 910 may use one or more neural network layers, such as a recurrent neural network layer (RNN), an RNN with long short-term memory, an RNN with a gated recurrent unit, an RRN with a simple recurrent unit (as described in U.S. patent application Ser. No. 15/789,241, which is incorporated herein by reference in the entirety), a bidirectional RNN, structured self-attention layer, or any neural network layer described herein or in any of the documents incorporated by reference.

In some implementations, the words of each message of the conversation may be processed separately. For example, a message feature vector may be computed for each message by processing the text encodings of the message (e.g., by using any of the techniques discussed above for context encoder 910). A conversation feature vector may then be computed by combining the message feature vectors (e.g., by processing the message feature vectors with a neural network or using an average of the message feature vectors).

Context scoring neural network 920 then processes one or more of the conversation feature vector, the designated message feature vector, the user embedding, and the conversation metadata. For example, the inputs may be concatenated into a single vector and then processed by context scoring neural network 920. Context scoring neural network 920 then outputs a context score for the designated message that is tailored to the preferences of the user via the user embedding.

Context scoring neural network 920 may be implemented using any appropriate techniques. In some implementations, context scoring neural network 920 may be implemented using a multi-layer perceptron with a single output neuron using a sigmoid activation function. The value of the output neuron may be the context score for the designated message being processed.

The processing of FIG. 9 may be repeated for other designated messages, and thus a context score may be computed for multiple designated messages or all designated messages.

Semantic Scoring

Figure 10:
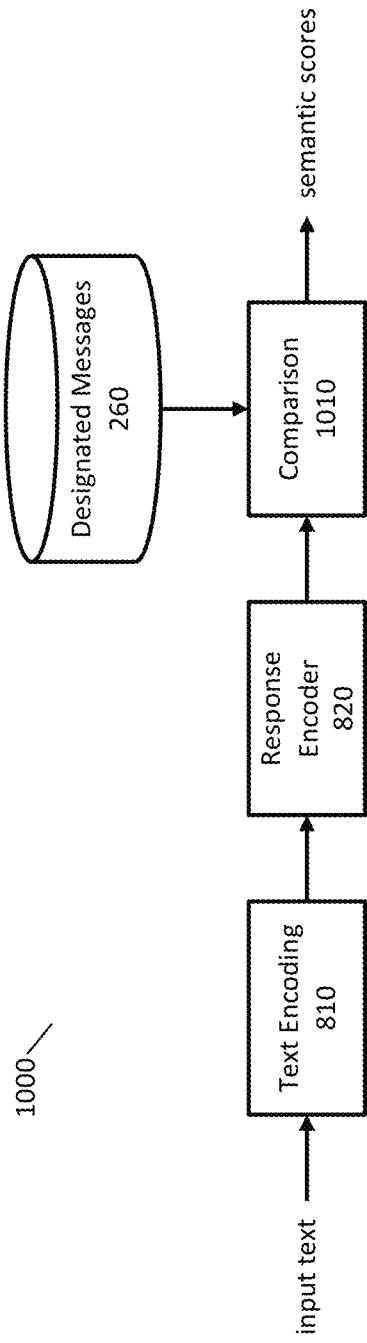
FIG. 10 is an example system for computing semantic scores for designated messages.

FIG. 10 is an example system 1000 that may be used to compute semantic scores for designated messages given input text entered by a user. In some implementations, semantic scoring component 720 of FIG. 7 may be implemented using system 1000.

In FIG. 10, the input text may be processed to compute an input text feature vector that represents the meaning of the input text. An input text feature vector is a vector in a vector space that represents the meaning of the input text. Input text feature vectors for two texts with similar meaning may be close to each other in this vector space, and input text feature vectors for two input texts with different meanings may be far from each other in this vector space. The contents of an input text feature vector (e.g., the numerical values) may not otherwise be meaningful to a person.

The input text feature vector may be computed by processing the input text with text encoding component 810 to obtain representations for the words of the input text. In some implementations, a text encoding component may be used that is different from text encoding component 810 as used in FIG. 8 (e.g., word embeddings may be used instead of byte-pair encodings).

The text encodings may then be processed by response encoder component 820 to compute the input text feature vector. In some implementations, an encoder component may be used that is different from response encoder component 820 as used in FIG. 8 (e.g., a different mathematical model or neural network may be used).

Comparison component 1010 may then compare the input text feature vector with the designated message feature vectors obtained from designated messages data store 260 to compute semantic scores for one or more designated messages. Comparison component 1010 may use any appropriate techniques to compare an input text feature vector with a designated message feature vector. For example, comparison component 1010 may compute a semantic score for a designated message as a distance or cosine similarity between the corresponding designated message feature vector and the input text feature vector.

Prefix Scoring

Figure 11:
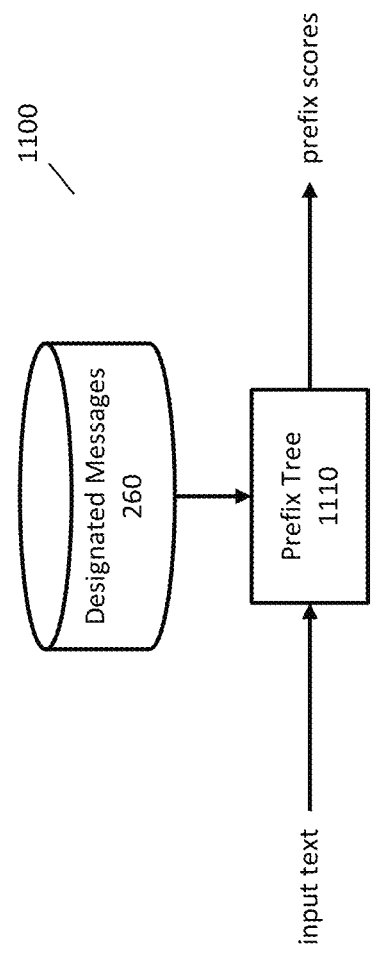
FIG. 11 is an example system for computing prefix scores for designated messages.

FIG. 11 is an example system 1100 that may be used to compute prefix scores for designated messages given input text entered by a user. In some implementations, prefix scoring component 730 of FIG. 7 may be implemented using system 1100.

Prefix tree component 1110 may receive the input text and determine whether the input text is a prefix of any of the designated messages. The input text may be a prefix for a designated message if the input text is the same as a beginning portion of the designated message.

In some implementations, prefix tree component 1110 may use a prefix tree (such as a trie) to determine if the input text is a prefix of any designated messages. Any appropriate prefix tree may be used. For example, a prefix tree may have a root node that corresponds to the beginning of a message, and an arc or edge for each letter or other character that could be used to start a message. Each arc may end in a node and be followed by additional arcs that indicate possible second characters of the word, and so forth. This process may be continued so that the prefix tree includes a sequence of arcs representing each designated message in the set of designated messages. Each node may indicate whether the sequence of characters starting from the root node corresponds to a designated message.

Prefix tree component 1110 may receive the characters of the input text and traverse the prefix tree to identify a node corresponding to the sequence of characters of the input text, and this node may be referred to as the input text node. The prefix tree may continue to be traversed past the input text node. All designated messages that are encountered in the prefix tree after the input text node will have the input text as a prefix. In this manner, designated messages having the input message as a prefix may be determined, and these messages may be referred to as prefix-matching designated messages.

Prefix tree component 1110 may then compute a prefix score for one or more designated messages. Any appropriate prefix score may be used. In some implementations, a designated message will have a score of zero if the input text is not a prefix of the designated message and a fixed non-zero (e.g., positive number) if the input text is a prefix of the designated message. In some implementations, the fixed non-zero score may be chosen to be a number higher than anticipated context scores and/or semantic scores so that designated messages that are a prefix match will have a high final score as computed in FIG. 7. In some implementations, the prefix score may correspond to a frequency score that indicates a number of times that the designated message appeared in the training corpus.

Training of User Embedding Vectors

The techniques described herein apply a user embedding vector to suggest messages to a user that are adapted or tailored to a user's communication style or preferences. A user embedding vector may be created for each user for whom it is desired to suggest messages. For example, a first user embedding vector may be created for a first user and applied to suggest messages for the first user, and a second user embedding vector may be created for a second user and applied to suggest messages for the second user.

A first user embedding vector for a first user may be trained or learned from a history of messages previously communicated by a first user. For example, where the first user is a customer support agent, a log or history of messages the agent has sent to customers may be used to train a first user embedding vector for the first user. Any appropriate training techniques may be used to train the first user embedding vector from the training corpus.

At the beginning of the training process, a first user embedding vector for a first user may be initialized, such as by setting the elements of the first user embedding vector to random values. During the training process, the first user embedding vector will be updated to learn the communication preferences or style of the first user.

A first user embedding vector may be trained using the system of FIG. 9. A first conversation may be obtained from the training corpus where the first user participated in the first conversation. For a first message transmitted by the first user, the inputs and outputs of FIG. 9 may be configured as follows: the text of the first conversation prior to the first message may be input as the conversation text; a first message feature vector may by computed from the first message (e.g., computed as described in FIG. 8 for the designated messages) and the first message feature vector may be input as the designated message feature vector; the current value of the first user embedding vector may be input as the user embedding; conversation metadata corresponding to the first conversation may be input as the conversation metadata (in some implementations, the conversation metadata may not be used during training); and the context score may be set to a high value, such as a value of 1.

Techniques such as stochastic gradient descent and back propagation may then be used to update the parameters of FIG. 9. In some implementations, the parameters of context encoder 910, context scoring neural network 920, and the first user embedding may be all trained simultaneously. In some implementations, some parameters may be trained ahead of time and not trained with the user embedding vectors. For example, the parameters of context encoder 910 may be trained ahead of time and remain fixed while training the first user embedding vector and the parameters of context scoring neural network 920.

This training process may be repeated for other messages sent by the first user in the first conversation, for other conversations with the first user, and for other users. This training process may be performed over batches of training data with the parameters of the user embedding vectors and the model parameters updated after each batch.

In some implementations, training of the user embeddings may use negative samples or noise contrastive estimation. When training with negative samples, a random message may be selected (e.g., a randomly selected designated message) instead of the message actually sent by the user. For example, when training a first user embedding for the first user, as described above, a message feature vector may be computed for a randomly selected message instead of the first message actually sent by the first user. Because a message is selected at random, it is likely not an appropriate or good message to be sent at the current stage of the conversation and it is referred to as a negative sample. Because a negative sample is input as the designated message feature vector, the output context score is set to a low value, such as a value of 0. Training with both positive and negative samples may improve the learning process for both the trained user embedding vectors and the model parameters.

Other variations of the above training process are possible. In some implementations, a portion of the training data (e.g., 10%) may be reserved to train a general user embedding vector to be used for new users or users without sufficient training data to have their own user embedding vector. New users may receive message suggestions according to the general user embedding vector, and as sufficient data is obtained to train a user embedding vector for the new user, the new user may be transitioned to their own user embedding vector.

In some implementations, a portion of a user's training data may be reserved or used for other aspects of suggesting messages. For example, 50% of a user's training data may be used to compute a frequency or percentage that a user has used individual designated messages. The designated message frequencies may then be input as part of the conversation metadata.

Implementation

Figure 12:
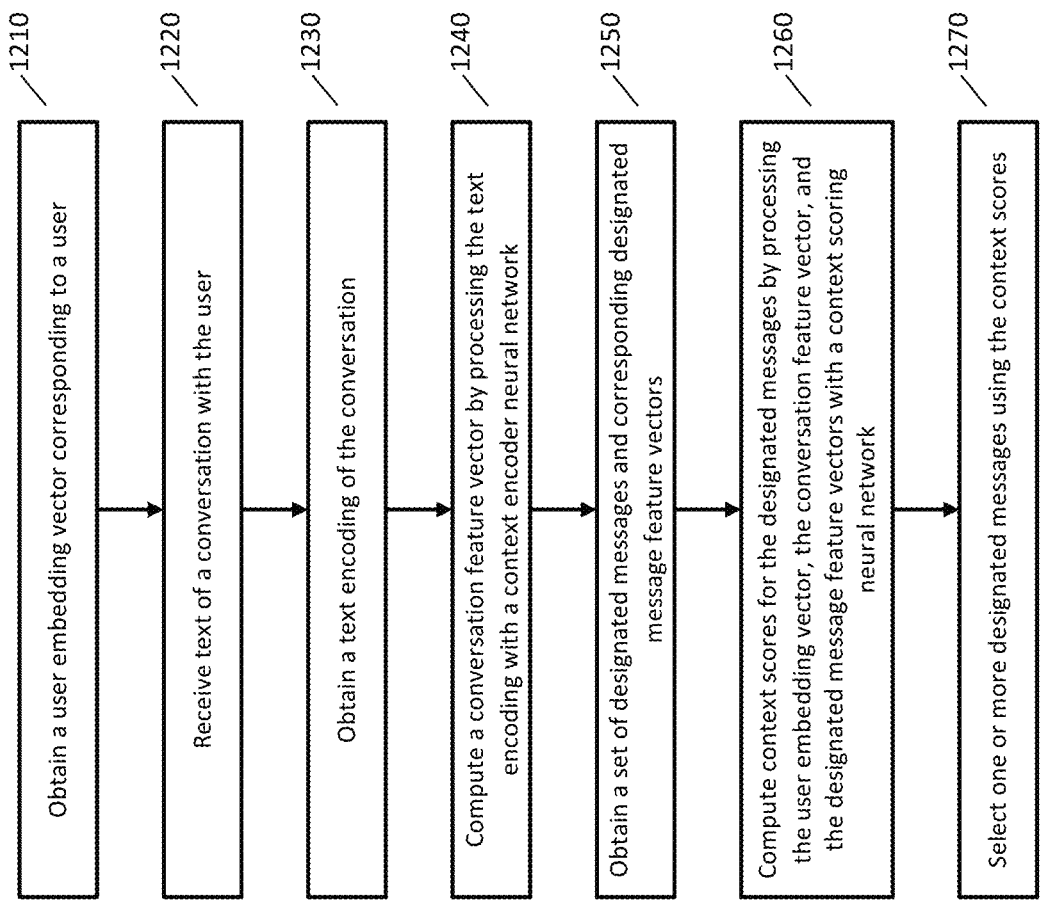
FIG. 12 is an example method for suggesting messages with a user embedding vector.

FIG. 12 is a flowchart of an example method for selecting one or more designated messages as suggestions for a user with a user embedding vector.

At step 1210, a user embedding vector is obtained corresponding to a user who is participating in a conversation. The user may be in a conversation with another user or with an automated natural language processing system, such as an automated personal assistant (e.g., Siri or Google Assistant). The conversation may have any subject matter or purpose, including but not limited to obtaining customer support from a company. The user embedding vector may represent the conversational preferences or style of the user as described herein and may be used by a neural network to tailor or adapt message suggestions to the user.

At step 1220, text of the conversation with the user is received. The text of the conversation may include the text of one or more messages transmitted in the conversation and/or may include input text entered by the user (or by a different user in the conversation) that has not yet been sent as a message, such as a partially composed message. In some implementations, the text of the conversation may be obtained by performing speech recognition on audio of the conversation.

At step 1230, text encodings are obtained for the words of the conversation. Text encodings may be obtained from the words using any appropriate techniques, such as any of the techniques described herein.

At step 1240, a conversation feature vector is computed by processing the text encodings with a context encoder neural network. The conversation feature vector may be computed from text encodings of one or more messages of the conversation and/or text encodings of input text. The context encoder neural network may include any appropriate neural network, such as any of the neural networks described herein.

At step 1250, a set of designated messages and corresponding designated message feature vectors are obtained. Any appropriate set of designated messages may be obtained and the designated message feature vectors may be computed using any appropriate techniques, such as any of the techniques described herein.

At step 1260, context scores are computed for the designated messages by processing the user embedding vector, the conversation feature vector, and the designated messages feature vectors with a context scoring neural network. The context scoring neural network may be any appropriate neural network, such as any of the neural networks described herein.

In some implementations the context scoring neural network may compute one context score at each iteration of processing. For example, a context scoring neural network may process the user embedding vector, the conversation feature vector, and a first designated messages feature vector to compute a first context score for the first designated message. The context scoring neural network may process the user embedding vector, the conversation feature vector, and a second designated messages feature vector to compute a second context score for the second designated message, and so forth. Context scores may accordingly be computed for some or all of the designated messages.

At step 1270, one or more designated messages are selected using the context scores. Any appropriate techniques may be used to select designated messages using the context scores. In some implementations, a final score may be computed for each designated message using the context scores and other scores (e.g., the semantic scores and prefix scores described above), and the one or more designated messages may be selected using the final scores. The final scores may be computed from the context scores using any appropriate techniques, such as any of the techniques described herein.

After one or more designated messages have been selected, the selected designated messages may be presented as suggestions to the user, the user may select a suggested message, and the selected suggested message may be transmitted in the conversation as being from the user, as described above.

Figure 13:
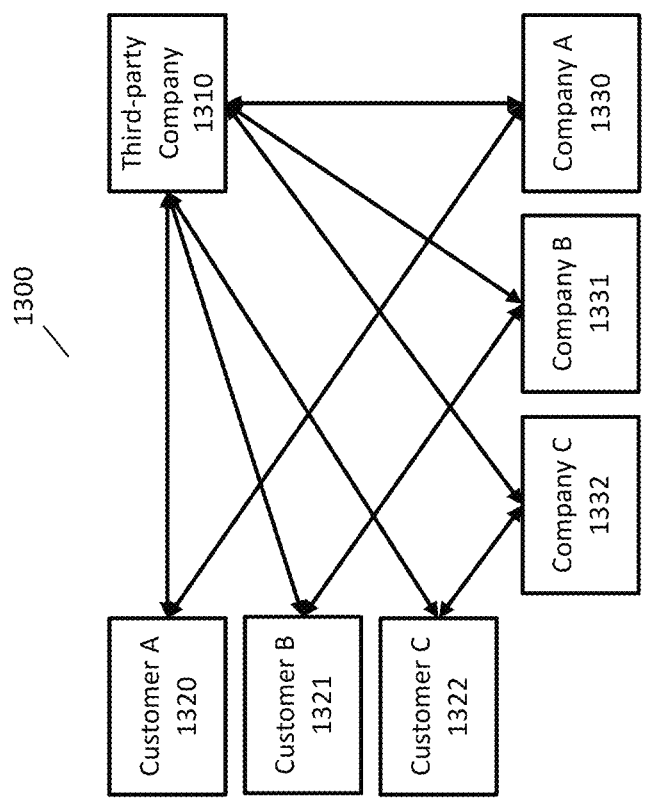
FIG. 13 is an example system whereby a third-party company provides message suggestion services to other companies.

In some implementations, a third-party company may provide services to other companies to suggest messages to customers, employees, or other people affiliated with the companies. For example, a company may provide a messaging application for use by its customers, and the company may use services of the third-party company to suggest a message for the customer. For another example, a company may provide customer support to its customers via a messaging platform, and the company may use the services of the third-party company to suggest messages to customer service representatives and/or customers. A company may find it more cost effective to use the services of the third-party company than to implement its own suggestion services. FIG. 13 illustrates an example architecture that may be used by a company to obtain assistance from a third-party company in providing customer support to its customers. A similar architecture may be used by a company that provides a messaging platform to its customers.

FIG. 13 illustrates a system 1300 that allows third-party company 1310 to provide message suggestion services to multiple companies. In FIG. 13, third-party company 1310 is providing message suggestion services to company A 1330, company B 1331, and company C 1332. Third-party company 1310 may provide message suggestion services to any number of companies.

Customers of each company may seek customer support from a company where the support process uses the services of third-party company 1310. For example, customer A 1320 may be seeking support from company A 1330, customer B 1321 may be seeking support from company B 1331, and customer C 1322 may be seeking support from company C 1332. It may or may not be apparent to the customers whether they are using services of third-party company 1310.

Third-party company 1310 may assist a company in providing message suggestion services in a variety of ways. In some implementations, third-party company 1310 may assist in connecting a customer with a customer service representative working on behalf of the company. For example, third-party company 1310 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 1310, customers, and companies may be architected in a variety of ways. In some implementations, all communications between a customer and a company may be via third-party company 1310 and there may not be any direct connection between the customer and the company. In some implementations, third-party company 1310 may communicate with the company but may not communicate directly with the customer. In some implementations, a customer may communicate directly with the company and also third-party company 1310.

Where a customer is connected to both a company and third-party company 1310, each of the two connections may be used for different kinds of requests. For example, where the customer is interacting with the company in a way that does not require the services of third-party company 1310 (e.g., navigating a web site of the company), the customer may use the network connection with the company. Where the customer is interacting with the company in a way that uses the services of third-party company 1310, the customer may use the network connection with third-party company. It may not be apparent to the customer whether the customer is using a network connection with the company or with third-party company 1310.

Figure 14:
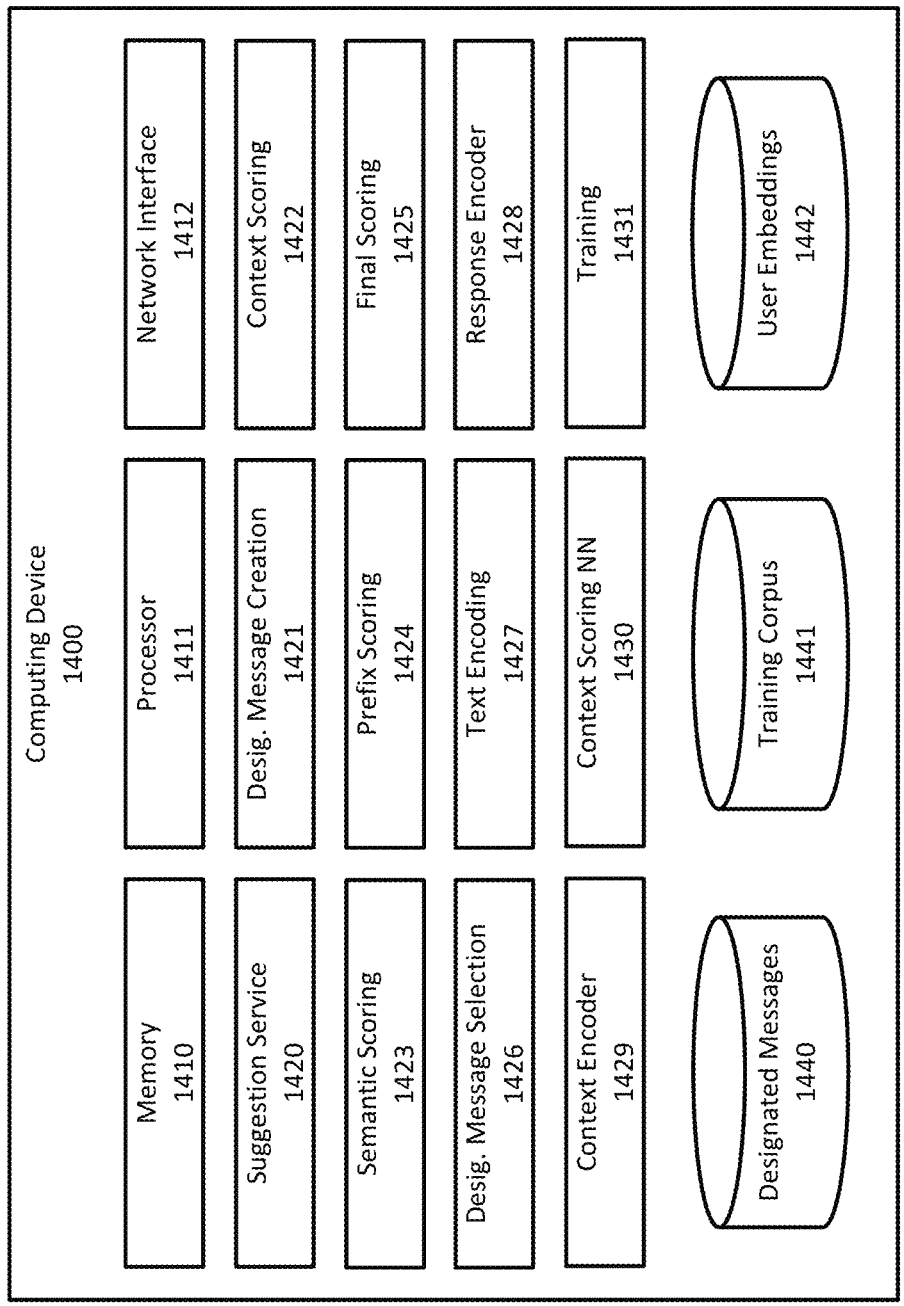
FIG. 14 is an example computing device that may be used to suggest messages and/or training a mathematical model for suggesting messages.

FIG. 14 illustrates components of one implementation of a computing device 1400 for implementing any of the techniques described above. In FIG. 14, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1400 may include any components typical of a computing device, such as volatile or nonvolatile memory 1410, one or more processors 1411, and one or more network interfaces 1412. Computing device 1400 may also include any input and output components, such as displays, keyboards, and touch screens. Computing device 1400 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1400 may have a suggestion service component 1420 that may facilitate receiving data for selecting designated messages as message suggestions, presenting suggestions to users, and receiving selections of suggested messages by users using any of the techniques described herein. Computing device 1400 may have a designated message creation component 1421 that may create a set of designated messages from a corpus of messages using any of the techniques described herein. Computing device 1400 may have a context scoring component 1422 that may compute a context score for one or more designated messages using any of the techniques described herein. Computing device 1400 may have a semantic scoring component 1423 that may compute a semantic score for one or more designated messages using any of the techniques described herein. Computing device 1400 may have a prefix scoring component 1424 that may compute a prefix score for one or more designated messages using any of the techniques described herein. Computing device 1400 may have a final scoring component 1425 that may compute a final score for one or more designated messages from other designated message scores using any of the techniques described herein. Computing device 1400 may have a designated message selection component 1426 that may select one or more designated messages using designated message scores and any of the techniques described herein. Computing device 1400 may have a text encoding component 1427 that may compute text encodings or obtain previously-computed text encodings using any of the techniques described herein. Computing device 1400 may have response encoder component 1428 that may compute a message feature vector by processing text of a message using any of the techniques described herein. Computing device 1400 may have a context encoder neural network component 1429 that may compute a conversation feature vector from text of a conversation using any of the techniques described herein. Computing device 1400 may have a context scoring neural network 1430 that may compute a context score for a designated message using any of the techniques described herein. Computing device 1400 may have a training component 1431 that may train any of the mathematical models described herein using any of the techniques described herein.

Computing device 1400 may include or have access to various data stores. Data stores may use any known storage technology such as files, relational databases, non-relational databases, or any non-transitory computer-readable media. Computing device 1400 may have designated messages data store 1440 that may store a set of designated messages that may be used to suggest messages to a user. Computing device 1400 may have training corpus data store 1441 that may be used to train mathematical models for suggesting messages. Computing device 1400 may have user embedding data store 1442 that may be used to store user embeddings of users for whom messages may be suggested.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, interne client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network.

The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
   obtaining a user embedding vector corresponding to a user, wherein the user embedding vector represents the user in a first vector space;
   receiving text of a conversation with the user;
   computing a conversation feature vector using the text of the conversation and a first neural network, wherein the conversation feature vector represents the conversation in a second vector space;
   obtaining a set of designated messages, wherein each designated message is associated with a corresponding designated message feature vector;
   computing a first context score for a first designated message of the set of designated messages by processing the user embedding vector, the conversation feature vector, and a first designated message feature vector with a second neural network;
   selecting the first designated message using the first context score; and
   presenting the first designated message as a suggested message to the user.

2. The computer-implemented method of claim 1, wherein computing the conversation feature vector comprises:
   obtaining word embeddings for the text of the conversation, wherein a word embedding represents a corresponding word in a third vector space; and
   processing the word embeddings with the first neural network.

3. The computer-implemented method of claim 1, comprising:
   selecting a second designated message using the first context score; and
   presenting the second designated message as a suggested message to the user.

4. The computer-implemented method of claim 1, comprising:
   obtaining text encodings for text of the first designated message; and
   computing the first designated message feature vector by processing the text encodings for the text of the first designated message with a response encoder neural network.

5. The computer-implemented method of claim 1, comprising:
   obtaining input text entered by the user;
   computing a first input text score for the first designated message; and
   selecting the first designated message using the first input text score.

6. The computer-implemented method of claim 1, comprising:
   obtaining input text entered by the user;
   obtaining text encodings for the input text;
   computing an input text feature vector by processing the text encodings of the input text with a response encoder neural network;
   computing a first semantic score for the first designated message using the input text feature vector and the first designated message feature vector; and
   selecting the first designated message using the first semantic score.

7. The computer-implemented method of claim 6, wherein computing the first semantic score comprises computing a distance or a cosine similarity between the input text feature vector and the first designated message feature vector.

8. The computer-implemented method of claim 1, wherein the second neural network comprises a multi-layer perceptron.

9. A system, comprising:
   at least one server computer comprising at least one processor and at least one memory, the at least one server computer configured to:
     obtain a user embedding vector corresponding to a user, wherein the user embedding vector represents the user in a first vector space;
     receive text of a conversation with the user;
     compute a conversation feature vector using the text of the conversation and a first neural network, wherein the conversation feature vector represents the conversation in a second vector space;
     obtain a set of designated messages, wherein each designated message is associated with a corresponding designated message feature vector;
     compute a first context score for a first designated message of the set of designated messages by processing the user embedding vector, the conversation feature vector, and a first designated message feature vector with a second neural network;
     select the first designated message using the first context score; and
     present the first designated message as a suggested message to the user.

10. The system of claim 9, wherein the user embedding vector is trained using messages sent by the user and represents a conversational style or conversational preferences of the user.

11. The system of claim 9, wherein the user is a customer support agent of a company and the system is implemented by a third-party company providing services to the company.

12. The system of claim 9, wherein the at least one server computer is configured to:
    obtain input text entered by the user;
    obtain a first prefix score for the first designated message by comparing the input text to a prefix of the first designated message; and
    select the first designated message using the first prefix score.

13. The system of claim 12, wherein a prefix score has a first value if the input text is not a prefix of a corresponding designated message and has a second value if the input text is a prefix of the corresponding designated message.

14. The system of claim 9, wherein the at least one server computer is configured to:
    compute a first semantic score for the first designated message;
    compute a first prefix score for the first designated message; and
    select the first designated message using the first context score and the first prefix score.

15. The system of claim 9, wherein the first neural network comprises a recurrent neural network.

16. The system of claim 9, wherein the at least one server computer is configured to compute the first context score by processing conversation metadata with the second neural network.

17. One or more non-transitory, computer-readable media comprising computer-executable instructions that, when executed, cause at least one processor to perform actions comprising:
- obtaining a user embedding vector corresponding to a user, wherein the user embedding vector represents the user in a first vector space;
- receiving text of a conversation with the user;
- computing a conversation feature vector using the text of the conversation and a first neural network, wherein the conversation feature vector represents the conversation in a second vector space;
- obtaining a set of designated messages, wherein each designated message is associated with a corresponding designated message feature vector;
- computing a first context score for a first designated message of the set of designated messages by processing the user embedding vector, the conversation feature vector, and a first designated message feature vector with a second neural network;
- selecting the first designated message using the first context score; and
- presenting the first designated message as a suggested message to the user.

18. The one or more non-transitory, computer-readable media of claim 17, wherein the conversation is between the user and an automated natural language processing system.

19. The one or more non-transitory, computer-readable media of claim 17, wherein the second neural network was trained using negative sampling.

20. The one or more non-transitory, computer-readable media of claim 17, wherein the user embedding vector was computed during training of the second neural network.

21. The one or more non-transitory, computer-readable media of claim 17, wherein the set of designated messages was obtained from a data store of customer support messages of a company.

* * * * *